(12) United States Patent
Michisaka et al.

(10) Patent No.: US 7,249,648 B2
(45) Date of Patent: Jul. 31, 2007

(54) MOTORIZED VEHICLE, AND RELATED FRAME STRUCTURE

(75) Inventors: Susumu Michisaka, Saitama (JP); Masao Ogawa, Saitama (JP); Tomokatsu Suda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 465 days.

(21) Appl. No.: 10/833,507

(22) Filed: Apr. 28, 2004

(65) Prior Publication Data

US 2004/0231908 A1   Nov. 25, 2004

(30) Foreign Application Priority Data

May 9, 2003 (JP) .............................. 2003-132398

(51) Int. Cl.
*B62D 21/00* (2006.01)
*B62K 11/00* (2006.01)

(52) U.S. Cl. ....................... 180/219; 180/311; 180/312; 280/281.1; 280/781; 224/419

(58) Field of Classification Search ................. 180/219, 180/311, 312; 280/281.1, 781, 291; 224/413, 224/419, 424, 425, 488

See application file for complete search history.

(56) References Cited

U.S. PATENT DOCUMENTS 4,953,911 A * 9/1990 Hanagan ................. 297/215.12
5,480,001 A * 1/1996 Hara ........................... 180/227
7,011,240 B2 * 3/2006 Kan et al. .................... 224/413
7,017,932 B1 * 3/2006 Miles ........................... 280/291

FOREIGN PATENT DOCUMENTS

| DE | 38 30 702 A | 3/1990 |
| DE | 42 01 207 A | 7/1993 |
| EP | 1 063 160 A | 12/2000 |
| JP | 58-181687 | 12/1983 |

* cited by examiner

*Primary Examiner*—Lesley D. Morris
*Assistant Examiner*—Marc A Scharich
(74) *Attorney, Agent, or Firm*—Carrier, Blackman & Associates, P.C.; William D. Blackman; Joseph P. Carrier

(57) ABSTRACT

A frame assembly for a motorized vehicle includes a vehicle body frame with an upper frame, a lower basket frame integrally attached to and extending downwardly from the upper frame, and an auxiliary frame which is separate from and operatively attached to the vehicle body frame. The upper frame includes a head pipe, a tubular main frame section attached to the head pipe, a pair of seat rails extending rearwardly in a divergent fashion from the main frame section, and a rear crossbar interconnecting the seat rails at rear portions thereof. The lower basket frame comprises left and right down tubes extending downwardly in a divergent fashion from the head pipe, a pair of left and right lower pipes extending rearwardly from lower ends of the respective down tubes, and a pair of medial frame sections extending between rear ends of the lower pipes and the seat rails. The auxiliary frame has a width substantially equal to a distance between the left and right lower pipes.

22 Claims, 24 Drawing Sheets

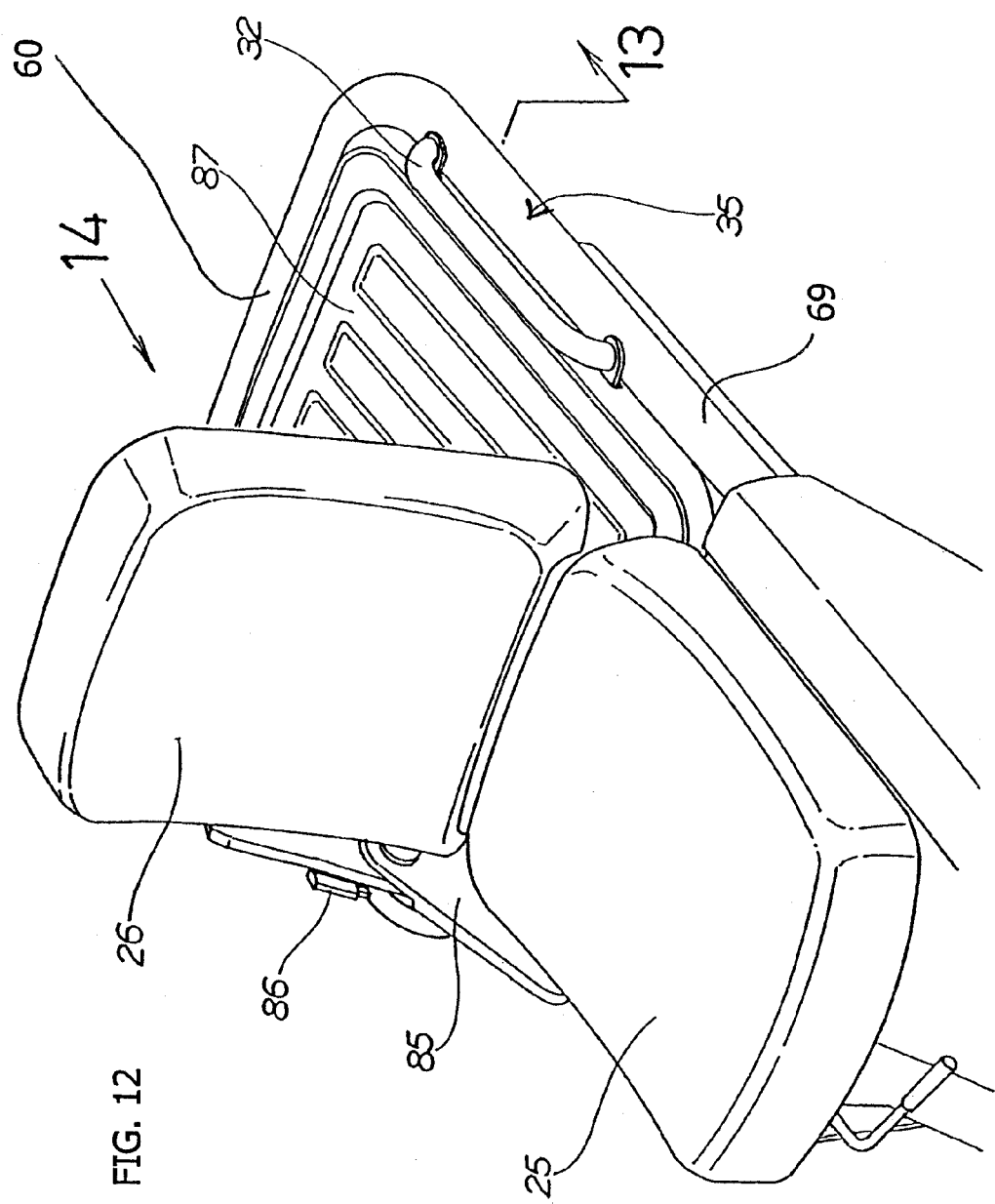

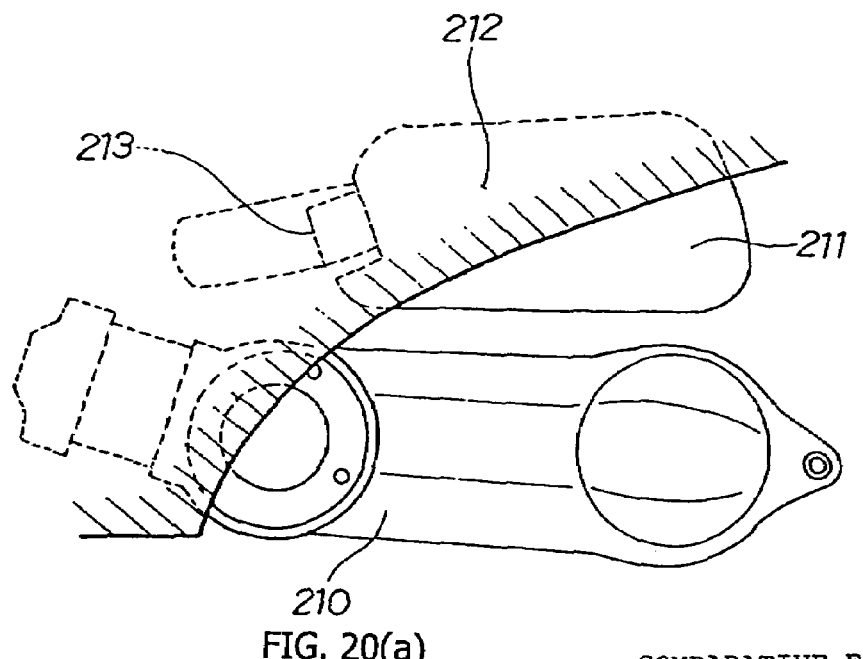
FIG. 20(a)  COMPARATIVE EXAMPLE
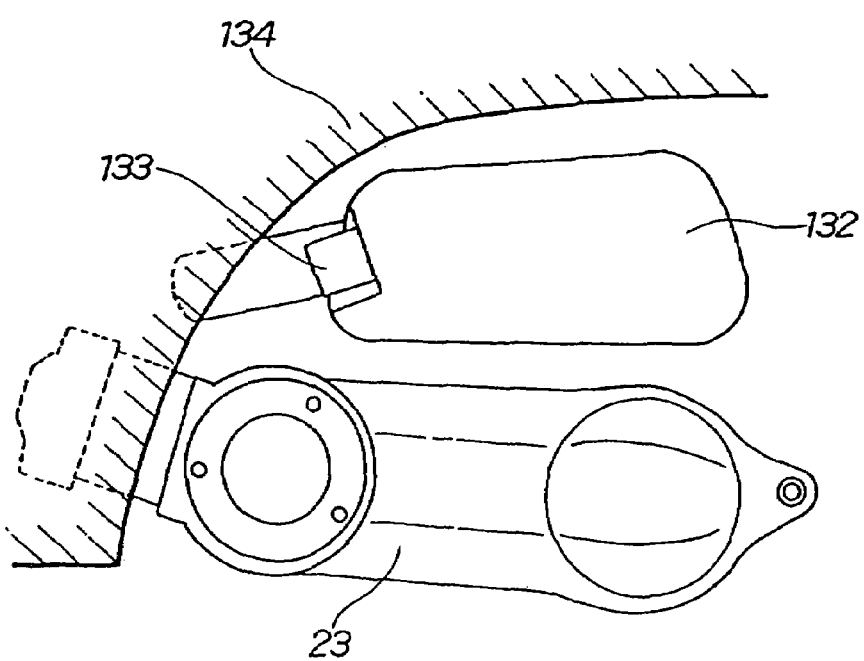
FIG. 20(b)  EXAMPLE

MOTORIZED VEHICLE, AND RELATED FRAME STRUCTURE

CROSS-REFERENCE TO RELATED APPLICATIONS

The present invention claims priority under 35 USC 119 based on Japanese patent application No. 2003-132398, filed May 9, 2003.

FIELD OF THE INVENTION

The present invention relates to an improvement in motorcycles. More particularly, the present invention relates to an improvement in a motorcycle that makes it possible to more easily strengthen a vehicle body frame, and to enhance the luggage mounting performance at a straddle portion of the frame.

DESCRIPTION OF THE BACKGROUND ART

Conventionally, a variety of motorcycles have been sold and put to practical use (see, for example, Japanese Utility Model Laid-open No. Sho 58-181687 (FIG. 2)).

FIG. 24 of the present application is a copy of FIG. 2 of Japanese Utility Model Laid-open No. Sho 58-181687. As shown in FIG. 24, a small-type motorcycle has been known in which luggage can be mounted on the upper side of an upper frame 20 extending forwards from a seat 2, an auxiliary frame is extended forwards from the upper side of the upper frame 20 to be a front carrier 12, and accessories such as a head light 18 are attached to the front carrier 12.

In such a known construction as that shown in FIG. 24, in a medium- or larger-type motorcycle, the vehicle body extends in the front-rear direction, so that it is necessary to strengthen the vehicle body frame, in order to ensure that luggage can be mounted on the upper frame. In a low floor type vehicle represented by a motor scooter with a straddle portion, also, it is desired to provide the straddle portion with a luggage mount portion. On the other hand, customers demand a variety of frame shapes.

Accordingly, it is an object of the present invention to provide a motorcycle and an improved frame structure for a motorized vehicle. More particularly, it is an object of the present invention to provide a motorcycle and frame having a strengthened vehicle body frame in order to enhance the luggage mounting performance at a straddle portion and which can be made in a variety of main frame section shapes.

SUMMARY OF THE INVENTION

In order to attain the above object, according to a first aspect hereof, a motorcycle is provided with a frame assembly which comprises a vehicle body frame which includes a head pipe, a main frame section extended from the head pipe, and a pair of rear frame sections extended rearwards from the main frame section. The vehicle body frame also includes a lower basket frame including left and right down tubes extended downward from the head pipe, and lower pipes extended rearwards from the down tubes, the lower pipes being connected to medial frame sections rising upwards, and the medial frame sections being connected to the rear frame sections of the vehicle body frame. The frame assembly hereof also includes an auxiliary frame which is operatively attached to, and is separate from the vehicle body frame. The auxiliary frame extends rearwards along the main frame section from a front side of the head pipe. The auxiliary frame has a left-right width substantially equal to that of the lower pipes. The auxiliary frame includes a front portion attached to the head pipe, and a rear portion attached to a portion of the vehicle body frame proximate a juncture between the main frame section and the rear frame sections.

Since the auxiliary frame has its front portion attached to the head pipe, and has its rear portion attached to the vehicle body frame at a portion proximate a juncture between the main frame section and the rear frame sections, a luggage space can be secured without specially reinforcing the auxiliary frame.

In addition, since the auxiliary frame has its left-right width made to be substantially equal to the distance between the left and right lower pipes, a rectangular frame body can be constructed of the auxiliary frame and the lower basket frame, and appearance quality can be enhanced.

With a rectangular frame thus provided, it is possible to construct a vehicle body cover by only attaching flat plate-like covers to the frame. Thus, it is possible to easily render the cover lighter in weight and more compact, while still maintaining appearance quality.

Furthermore, by only diverting a vehicle body frame of a conventional full-cover type motor scooter and adding an auxiliary frame to the vehicle body frame, it is possible to create a small vehicle having a new form.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 12 is a perspective view of a rear luggage carrier according to an embodiment of the present invention.

FIG. 20(a) is a side view of an air cleaner and a power unit as disclosed by the prior art.

FIG. 20(b) is a side view of an air cleaner and a power unit according to an embodiment of the invention.

DETAILED DESCRIPTION

In the present discussion, a motor scooter will be described as being a low floor type vehicle. However, the low floor type vehicle may be a motor scooter, a motorcycle, a motor tricycle or a four-wheel vehicle, inasmuch as it is a vehicle in which a front wheel or wheels and a rear wheel or wheels are provided at front and rear portions of a vehicle body frame, a main frame section extending rearwards from a head pipe, of the vehicle body frame, is V- or U-shaped in side view, and the driver can easily straddle the main frame section. The following description is intended to illustrate, rather than to limit the invention.

Figure 1:
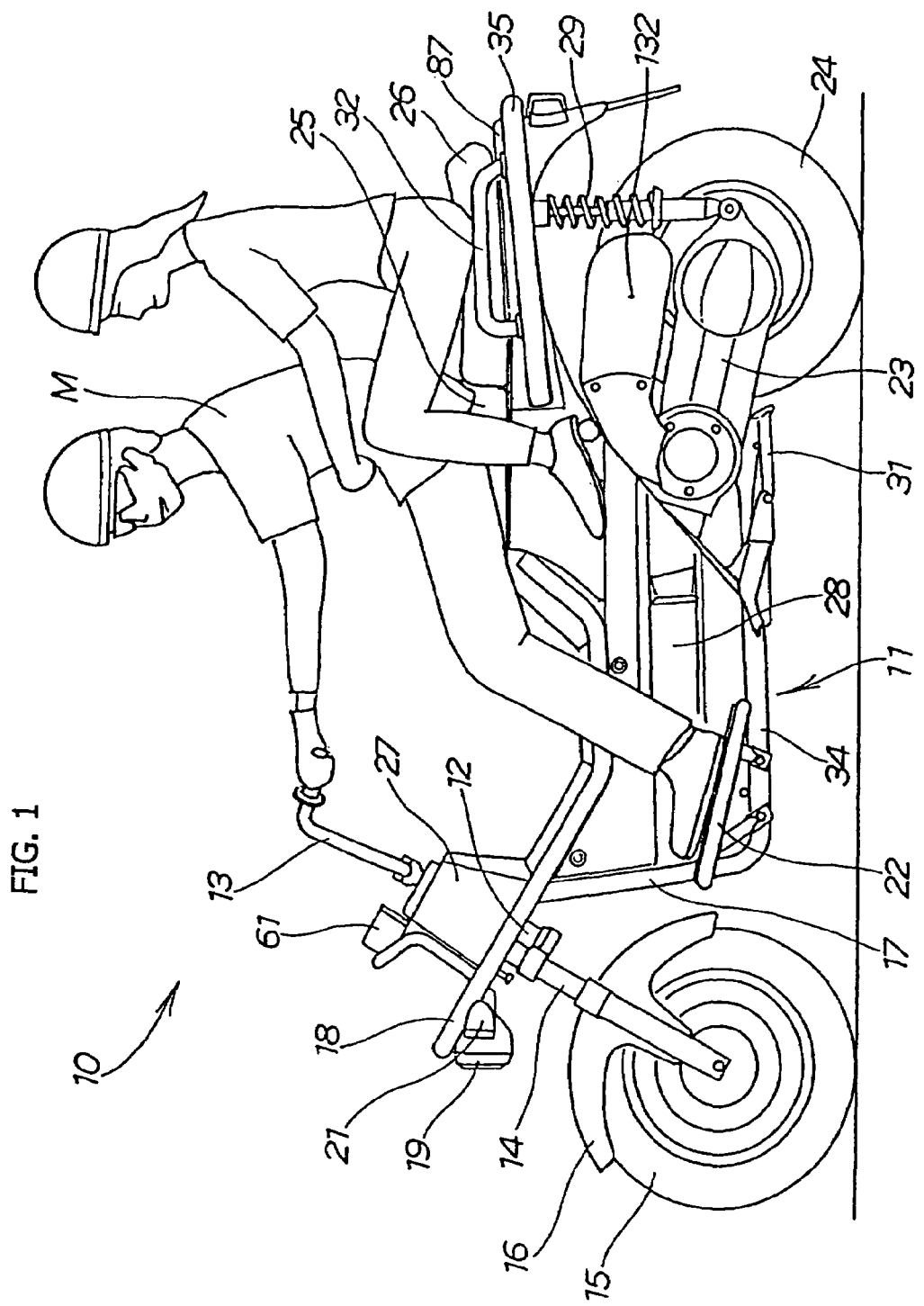
FIG. 1 is a side elevational view of a motor scooter comprising a frame assembly according to an illustrative embodiment of the present invention, adapted to carry 2 people thereon.

FIG. 1 is a side view of the motor scooter according to a selected illustrative embodiment of the present invention. The motor scooter 10 has a basic structure in which a steering handle 13 is pivotally and steerably attached to a head pipe 12 at a front portion of a vehicle body frame 11, and a front wheel 15 and a front fender 16 are mounted to a front fork 14 connected to the steering handle 13.

The motor scooter 10 is a light vehicle on which two persons can ride, and includes a frame assembly in which an auxiliary frame 18 is mounted to the vehicle body frame 11, a head light 19, direction indicator lamps 21 and the like are attached to the auxiliary frame 18. A pair of foot supports 22 are attached to down tubes 17 for supporting a driver's feet.

A power unit 23 is vertically swingably mounted to a rear portion of the vehicle frame 11, and a rear wheel 24 is rotatably mounted on the rear side of the power unit 23. A driver's seat 25 is provided above and toward the front side of the rear wheel 24, and a combined passenger seat and seat back assembly 26 is provided above the rear wheel 24.

In the figure, numeral 27 denotes a steering handle post cover, 28 denotes a side cover, 29 denotes a rear shock absorber, 31 denotes a stand, and 32 denotes a grab rail.

Figure 2:
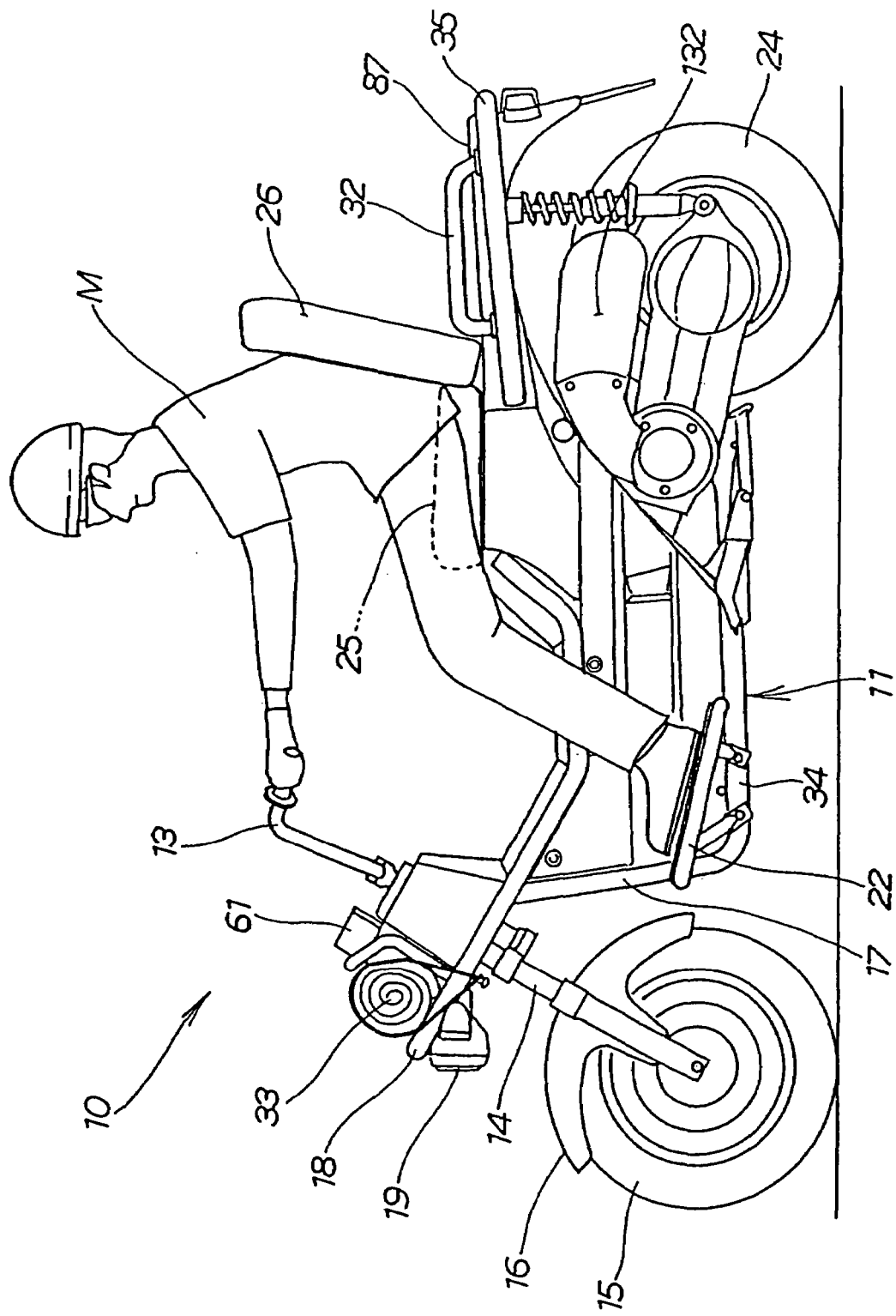
FIG. 2 is a side view of a motor scooter according to the present invention that has been modified into a one-person-riding type.

FIG. 2 is a side view of a motor scooter according to the present invention that has been modified to a one-person-riding type, and the basic construction that is the same as in FIG. 1, so that the same symbols as above are used again and the description of the basic construction is omitted. In this case, the above-mentioned combined passenger seat and seat back 26 is erected to be a backrest, or seat back, for the driver M. Besides, the figure shows the condition where a luggage item 33, such as a tent, is mounted on a front portion of the auxiliary frame 18.

Furthermore, this motor scooter is distinguished in that not only the steering handle 13 and the grab rails 32, but also the auxiliary frame 18, the down tubes 17, lower pipes 34 extended from the down tubes 17, and rear frame sections 35 are exposed.

In a conventional motor scooter, ordinarily, a vehicle body frame is covered with a vehicle body cover, so that most of the vehicle body frame is unexposed. On the contrary, in a vehicle body frame according to the present invention, most of the frame is exposed, to display a novel characteristic feature on an appearance basis.

Figure 3:
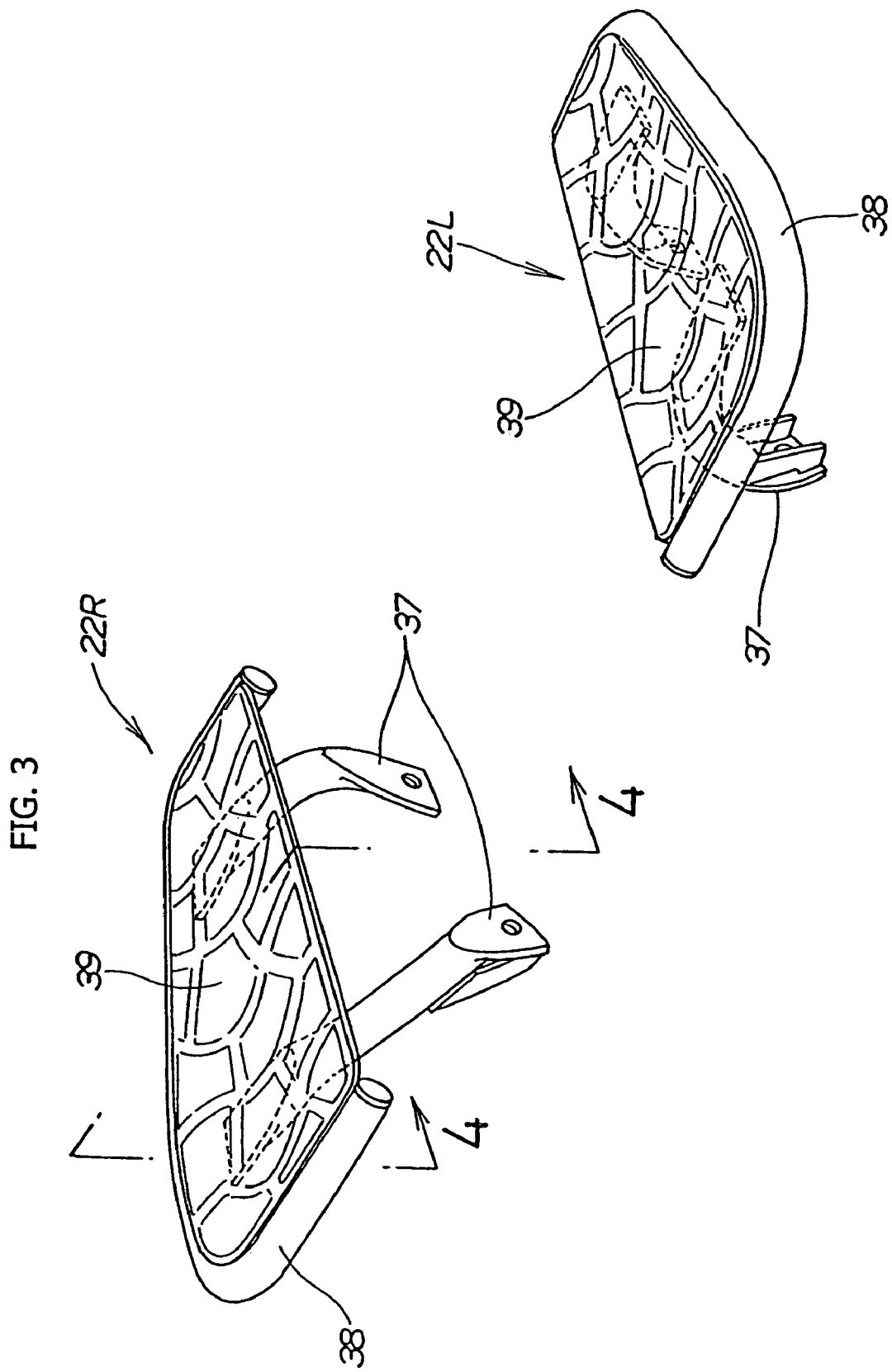
FIG. 3 is a perspective view of foot supports adopted for use as sub-components in the motor scooter according to the present invention.

FIG. 3 is a perspective view of foot supports adopted for use as sub-components in the present invention. A right foot support 22R, on which the driver puts his or her right foot, includes a receiving plate 36 (FIG. 4), a stay 37 for connecting the receiving plate 36 to the lower basket frame, and a peripheral pipe 38, set along the periphery of the receiving plate 36. The foot support 22R also includes a rubber plate 39, attached to the top surface of the receiving plate 36. A soft plastic plate may be used in place of the rubber plate 39.

A left foot support 22L on which the driver puts his or her left foot has the same structure as that described in connection with the right foot support 22R, so that the same symbols as above are again used, and description thereof is omitted.

Figure 4:
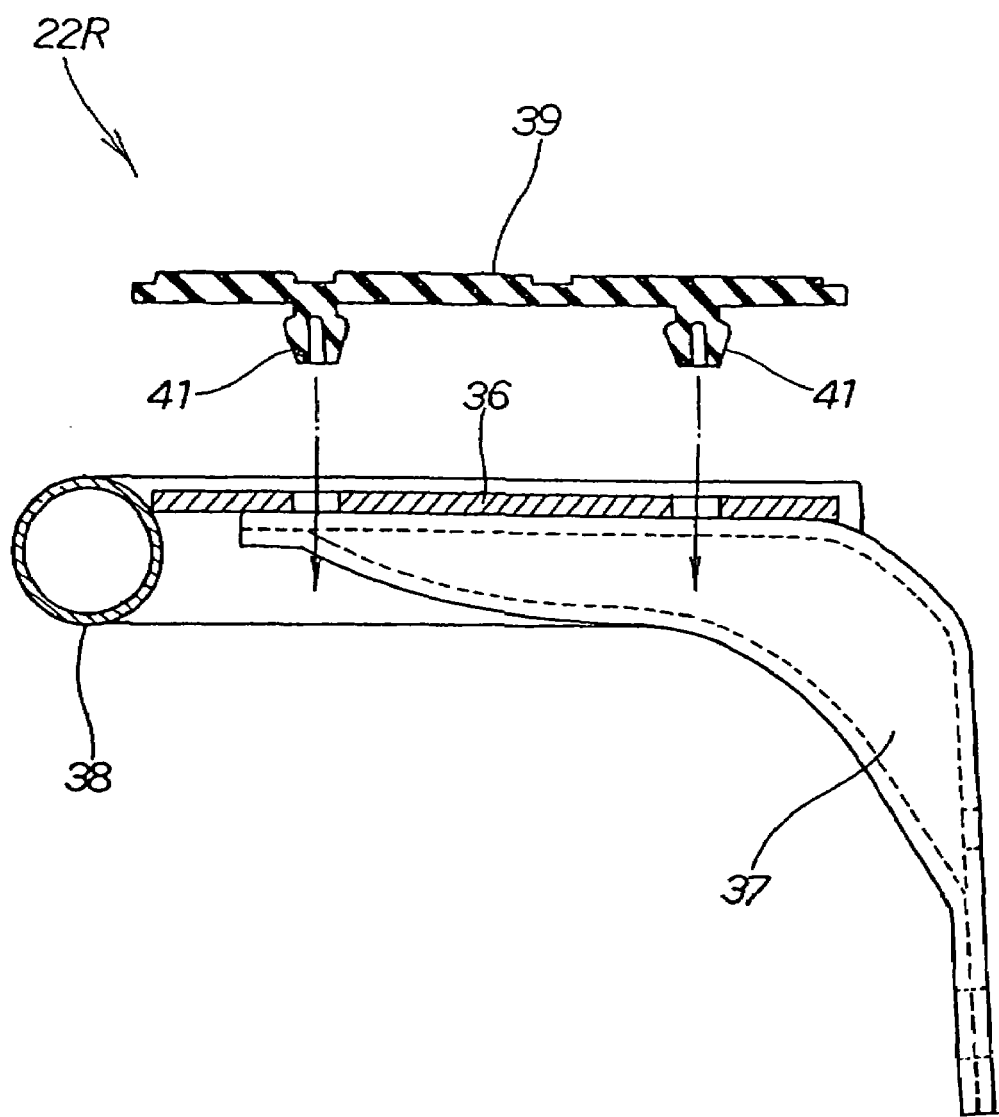
FIG. 4 is a sectional view of one of the foot supports of FIG. 3 taken along line 4-4.

FIG. 4 is a sectional view taken along line 4-4 of FIG. 3, showing that the rubber plate 39 has split-tip bulb form hook projections 41 extending downwardly thereon, and that the rubber plate 39 can be detachably attached to the receiving plate 36.

Conventionally, in some cases, flat plate type foot supports have been formed by aluminum die-casting or the like. While die-cast products are preferred due to good appearance thereof, a reduction in cost is also expected in the cases of medium- and smaller-type vehicles.

In view of this, foot supports assembled from steel plates by welding have also been adopted, but they are inferior to the die-cast aluminum foot supports from the viewpoints of weight, appearance, and the like.

In relation to this, the foot supports 22 (22L, 22R) according to the present invention have the structure in which the pipe 38 is set along the periphery of the receiving plate 36, so that the pipe 38 functions as a reinforcement for the receiving plate 36, and accordingly the receiving plate 36 can be reduced in plate thickness and weight. As a result, the foot supports 22L and 22R can be reduced in weight and cost, as compared with the die-cast foot supports, while maintaining the appearance and quality thereof.

In addition, the foot supports 22 according to the present invention can be manufactured by subjecting a steel member to plastic working such as cutting, bending, drawing, etc. and welding the plastically worked steel semi-products; therefore, there is no need for dies or a die-casting machine, and the production cost of the foot supports 22 can be lowered, as compared to that of the die-cast foot supports.

Figure 5:
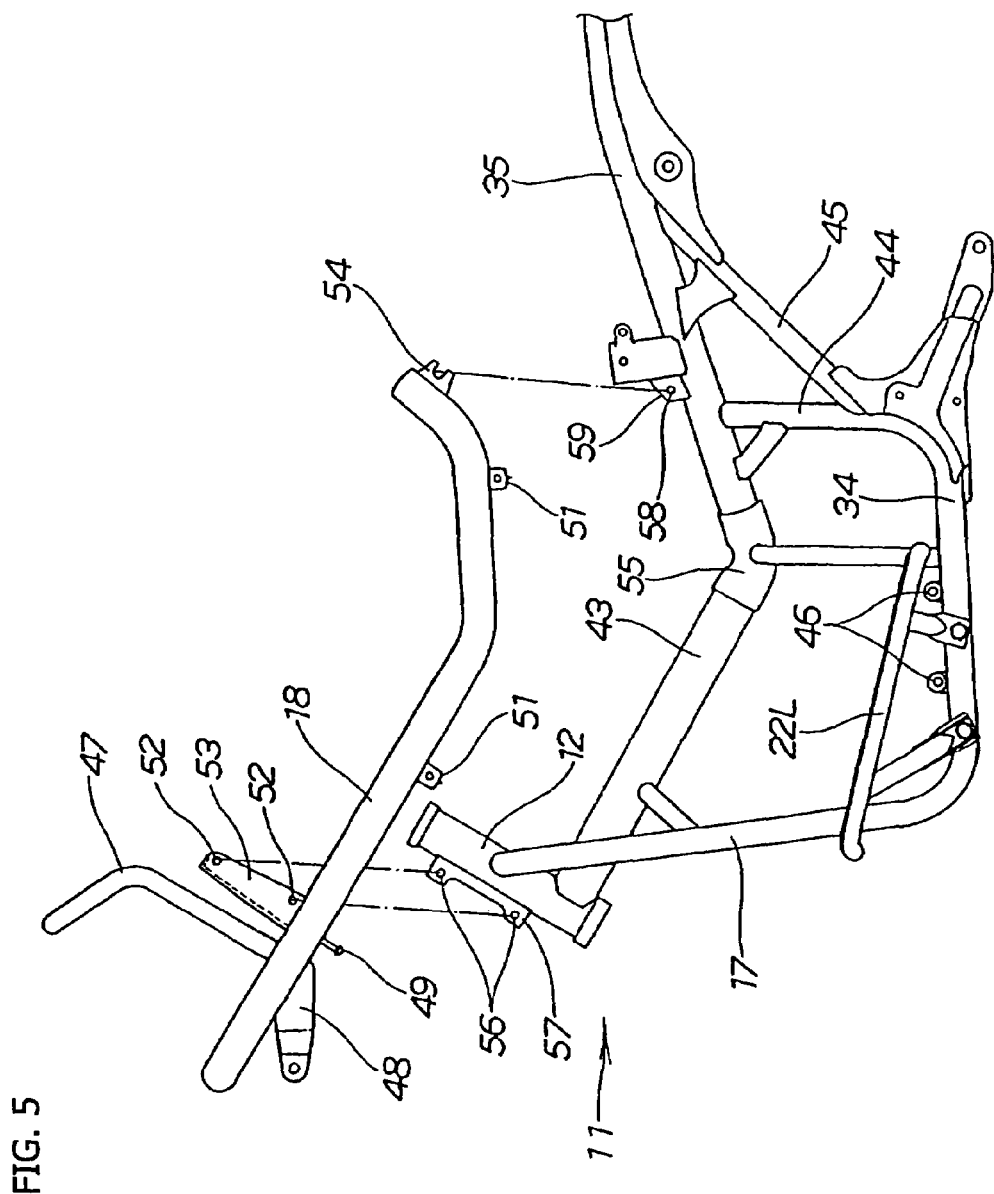
FIG. 5 is an exploded side plan view of a vehicle body frame and an auxiliary frame of the motor scooter frame assembly of FIG. 1 according to the present invention.
Figure 23:
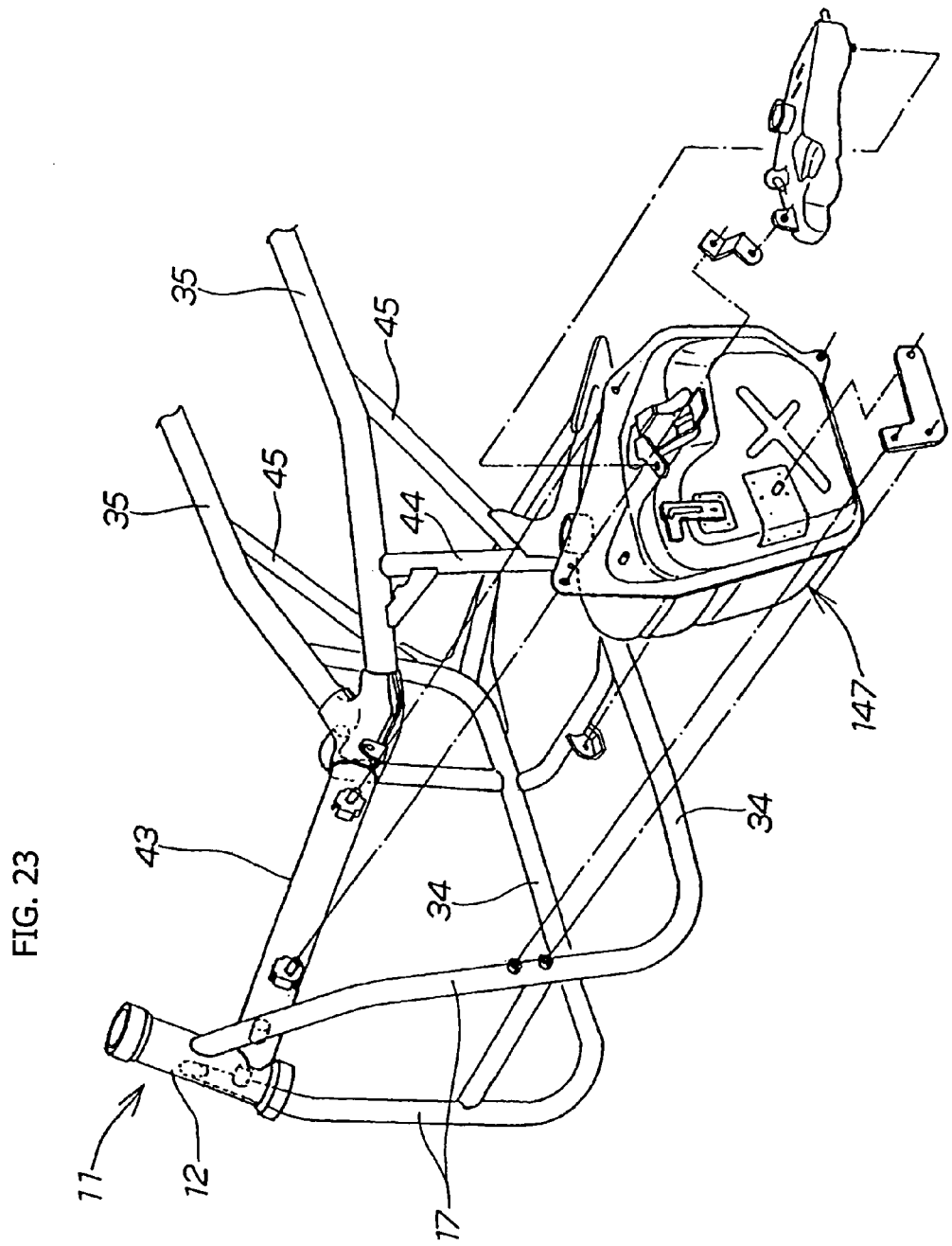
FIG. 23 is a perspective view, partially cut away, of a vehicle body frame according to the present invention, also showing a fuel tank.
Figure 24:
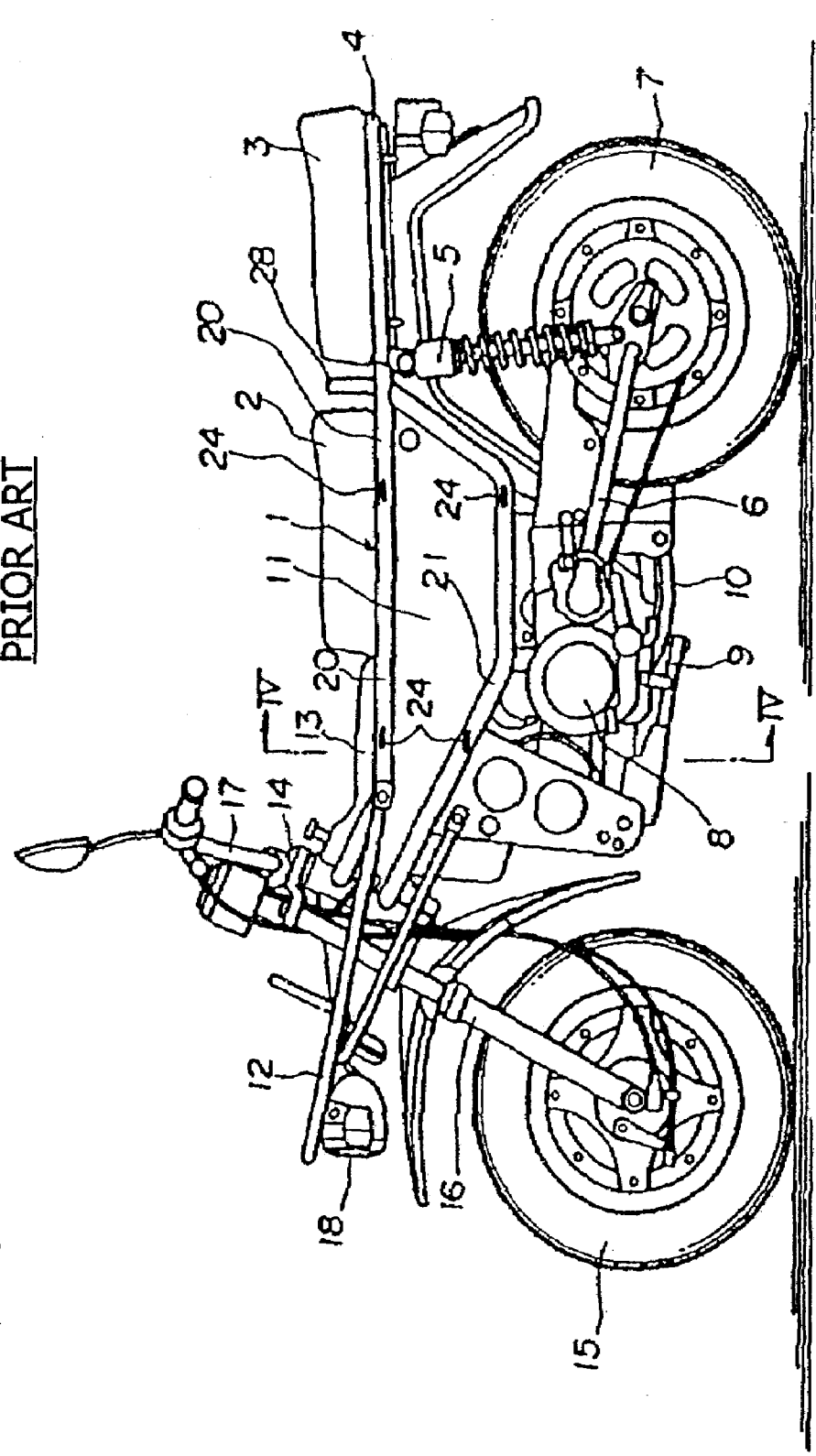
FIG. 24 is a side elevational view of a prior art motor vehicle, copied from a background art reference for comparitive purposes.

FIG. 5 is an exploded side view, partially cut away, of the vehicle body frame of the motor scooter according to a selected embodiment of the present invention. The vehicle body frame 11 includes an upper frame and a lower basket frame attached to the upper frame. The upper frame includes a hollow head pipe 12, and a main frame section 43, extended from the head pipe 12 and being V- or U-shaped in side view. With reference to FIG. 23, the upper frame also includes two rear frames 35, branching out from a Y-shaped connector fitting 55 and extended rearwards from a rear portion of the main frame section 43. The lower basket frame includes two down tubes 17 extended downwards from the head pipe 12, two spaced-apart lower pipes 34 extended substantially horizontally rearwardly from the lower ends of the down tubes 17, and two medial frame sections 44 rising from the rear ends of the lower pipes 34, and reinforcing stays 45 for connection between the medial frame sections 44 and the rear frame sections 35. The lower pipes 34 are each provided with cover fixing plates 46.

A simple-formed frame separately shown on the upper side in the figure is the auxiliary frame 18.

The details of the auxiliary frame 18 will be described below, whereas the details of the vehicle body frame 11 will be described referring to FIG. 23 later.

The main component of the auxiliary frame 18 is a substantially U-shaped tube 50. The auxiliary frame 18 comprises a luggage-supporting crown pipe 47 provided on the upper surface of a front portion of the U-shaped tube 50. A lamp support bracket 48 and a luggage hook 49 are also provided on the lower surface of a front portion of the auxiliary frame. Cover fixing brackets 51 provided on the lower surface thereof, a bracket 53 provided on the upper surface of a front portion thereof, the bracket 53 being provided with holes 52 and a slotted bracket 54 provided on the lower surface of a rear portion of the main U-shaped tube 50.

On the other hand, a front portion plate 57 provided with holes 56 is provided on the front surface of the head pipe 12 to allow attachment of the auxiliary frame thereto. A rear portion plate 59 provided with a hole 58 is provided on the upper surface of a front portion of each rear frame section 35, to receive the auxiliary frame 18.

The rear portion plate 59 is disposed in the vicinity of a Y-shaped connection 55, which forms a junction between the main frame section 43 and the rear frame sections 35. The Y-shaped connection 55, formed from a high-strength material, is used where the single main frame section 43 and the two rear frame sections 35 are joined. Provision of the rear portion plate 59 in the vicinity (in this embodiment, on the rear side) of the high-rigidity connection portion 55 is advantageous on a strength basis, in supporting the auxiliary frame 18.

The connecting bracket 53 of the auxiliary frame 18 is fastened to the front portion plate 57 of the head pipe with bolts, and each of the slotted brackets 54 is fastened to the rear portion plate 59 with a bolt, whereby the auxiliary frame 18 can be integrated to the upper frame at the head pipe 12 and the main frame section 43.

Figure 6:
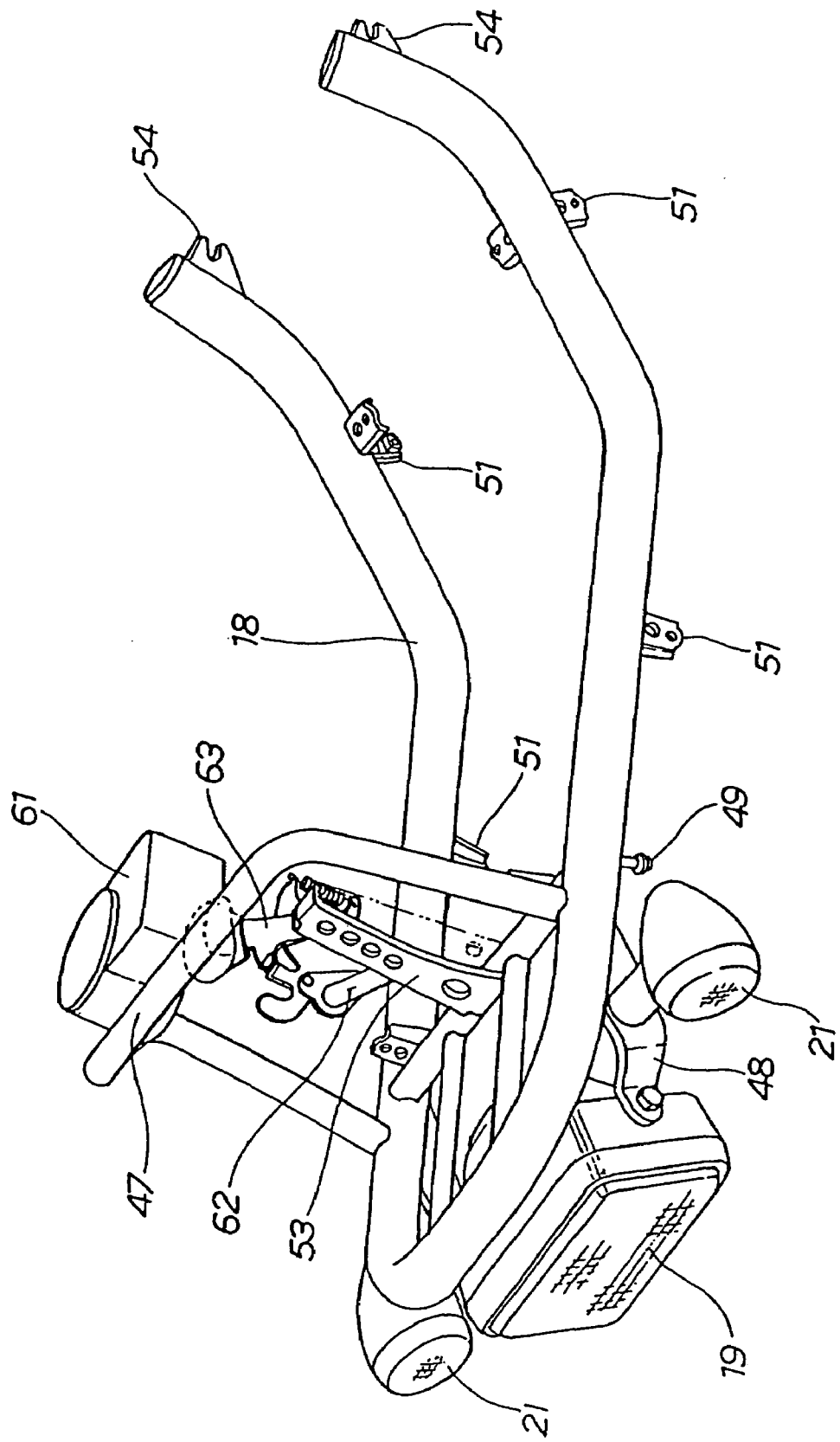
FIG. 6 is a perspective view of the auxiliary frame according to the present invention.

FIG. 6 is a perspective view illustrating the functions of the auxiliary frame 18 according to the present invention. The auxiliary frame 18 is a pipe frame structure, including the U-shaped tube 50, which provides a useful frame such that the direction indicator lamps 21 and the head light 19 can be attached to the lamp support bracket 48, a meter unit 61 can, optionally, be attached to the luggage-supporting crown pipe 47, and a parking brake lever 63 and the like can be attached to a right portion of the bracket 53 through a stay 62.

For example, when vehicle component parts such as the direction indicator lamps 21, the head light 19, the meter unit 61, and the parking brake lever 63 are preliminarily mounted onto the U-shaped tube 50 of the auxiliary frame 18 (this process is called pre-assembling), and the pre-assembled product (the assembly shown in FIG. 6 itself) is mounted onto the head pipe 12 and the main frame section 43, as shown in FIG. 5, it is possible to shorten the mounting time in an assembly line.

Figure 7:
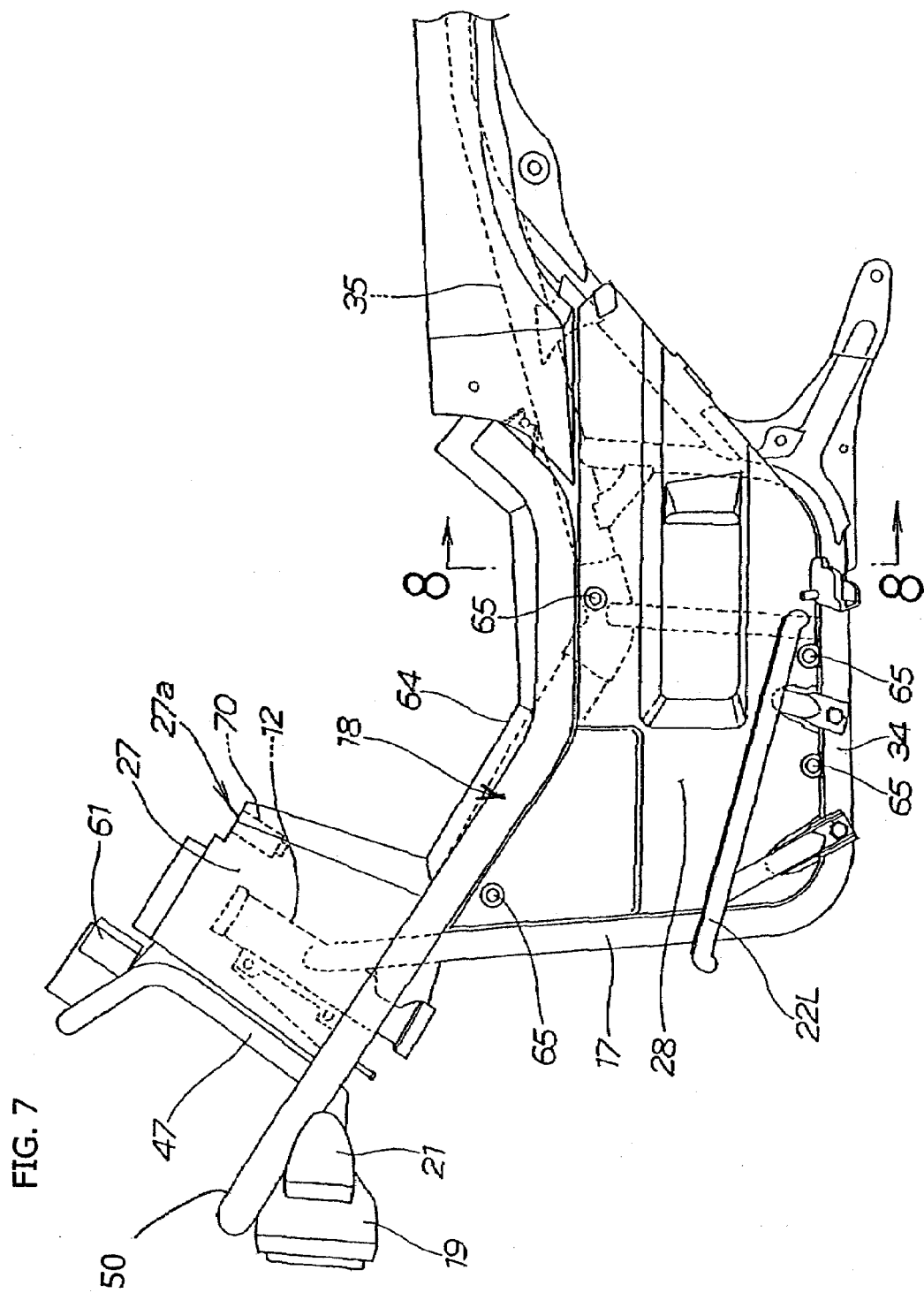
FIG. 7 is a side plan view of the frame assembly of the motor scooter of FIG. 1 according to the present invention.

FIG. 7 is a side view of the vehicle body frame of the motor scooter of FIG. 1, showing the condition after the auxiliary frame 18 is mounted onto the head pipe 12 and the rear frame sections 35, a center cover portion 64 comprising the steering handle post cover 27 integrally is coveringly mounted, a side cover 28 is mounted between the auxiliary frame 18 and the lower pipe 34 with bolts 65, and the foot support 22L is attached to the lower pipe 34.

The front surface of the steering handle post cover 27 is a flat surface as shown in the figure, i.e., a structure is adopted in which a front luggage carrier space can be left open.

A shelf portion 27a lowered by a foot support is formed at a rear upper portion of the steering handle post cover 27, so as to attach a lock device 70 (a detailed structure thereof will be described later) to the shelf portion 27a.

Figure 8:
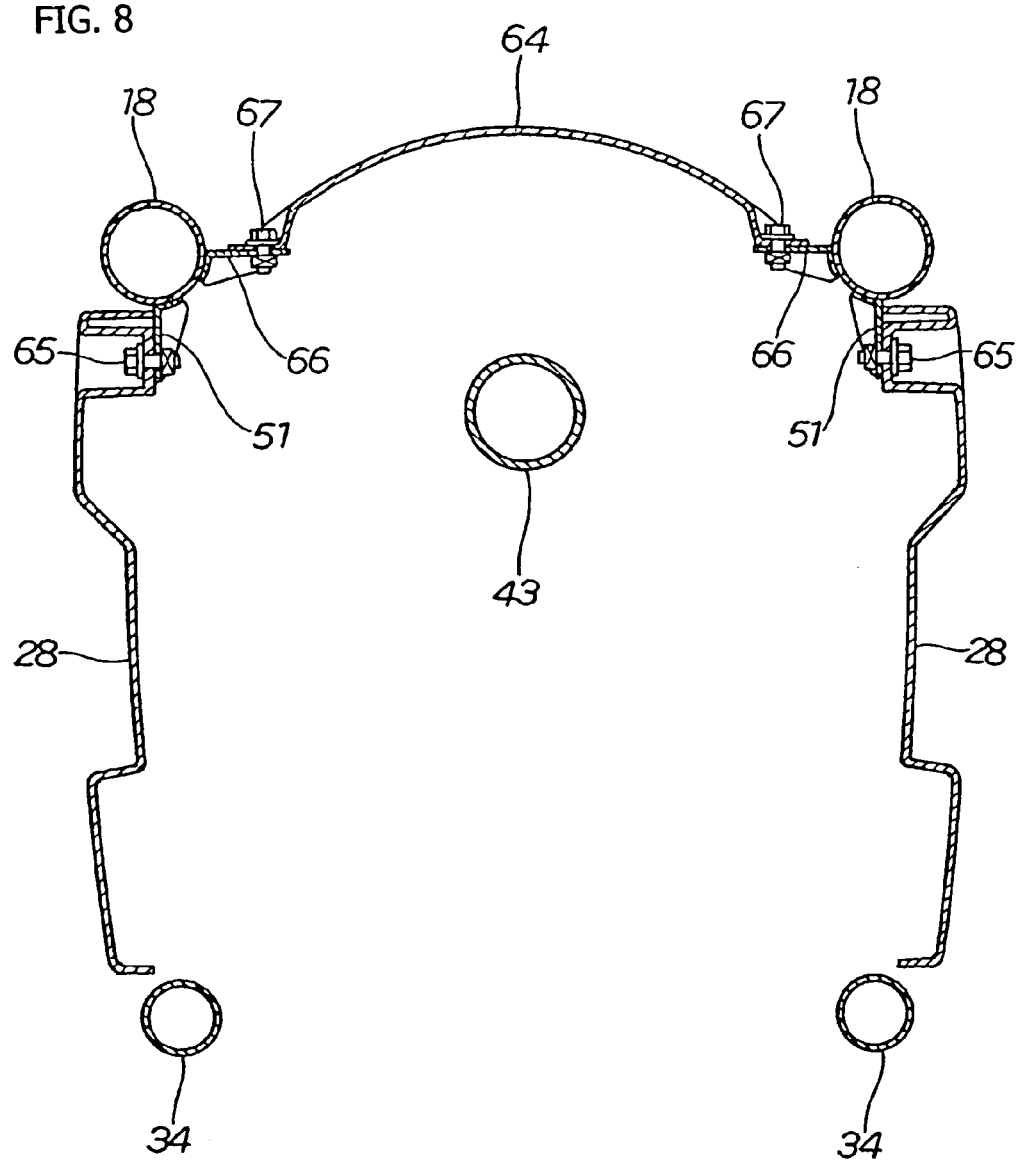
FIG. 8 is a sectional view of the frame assembly of FIG. 7 taken along line 8-8.

FIG. 8 is a sectional view taken along line 8-8 of FIG. 7, showing the condition after the center cover portion 64 is attached to cover fixing plates 66 appended to the auxiliary frame 18 with bolts 67, and the side covers 28 are attached to the cover fixing brackets 51 with bolts 65.

If it is attempted to fix the center cover portion 64 and the side covers 28 to the main frame section 43 with bolts, there would be need for large-scale cover mounting brackets.

In relation to this, the depicted embodiment of the present invention is characterized in that the auxiliary frame 18 is disposed on the upper side of the left and right lower pipes 34, and the center cover portion 64 and the side covers 28 are mounted by utilizing the auxiliary frame 18.

As a result, the auxiliary frame 18 can be utilized for luggage fixation and the like. In addition, since the center cover portion 64 and the side covers 28 (these are referred to as the vehicle body cover) are disposed on the inner side of the auxiliary frame 18 and the left and right lower pipes 34, the vehicle body cover as a whole can be made more compact, a unique exterior appearance is created, and the vehicle body cover can be reduced in weight and cost.

Furthermore, since the box-like vehicle body cover is surrounded with the auxiliary frame 18 and the lower pipes 34, it is possible to form a pipe-framed container-like outside shape as a whole, and appearance quality can be enhanced.

Besides, as is clear from the figure, large-scale cover mounting brackets are unnecessary, which enables a reduction in the production cost of the vehicle body frame.

Next, a steering handle lock mechanism provided for a burglarproof purpose will be described. It should be noted here that, in the present invention, a lock device comprising a steering handle lock mechanism incorporated in a combination switch is adopted.

Figure 9:
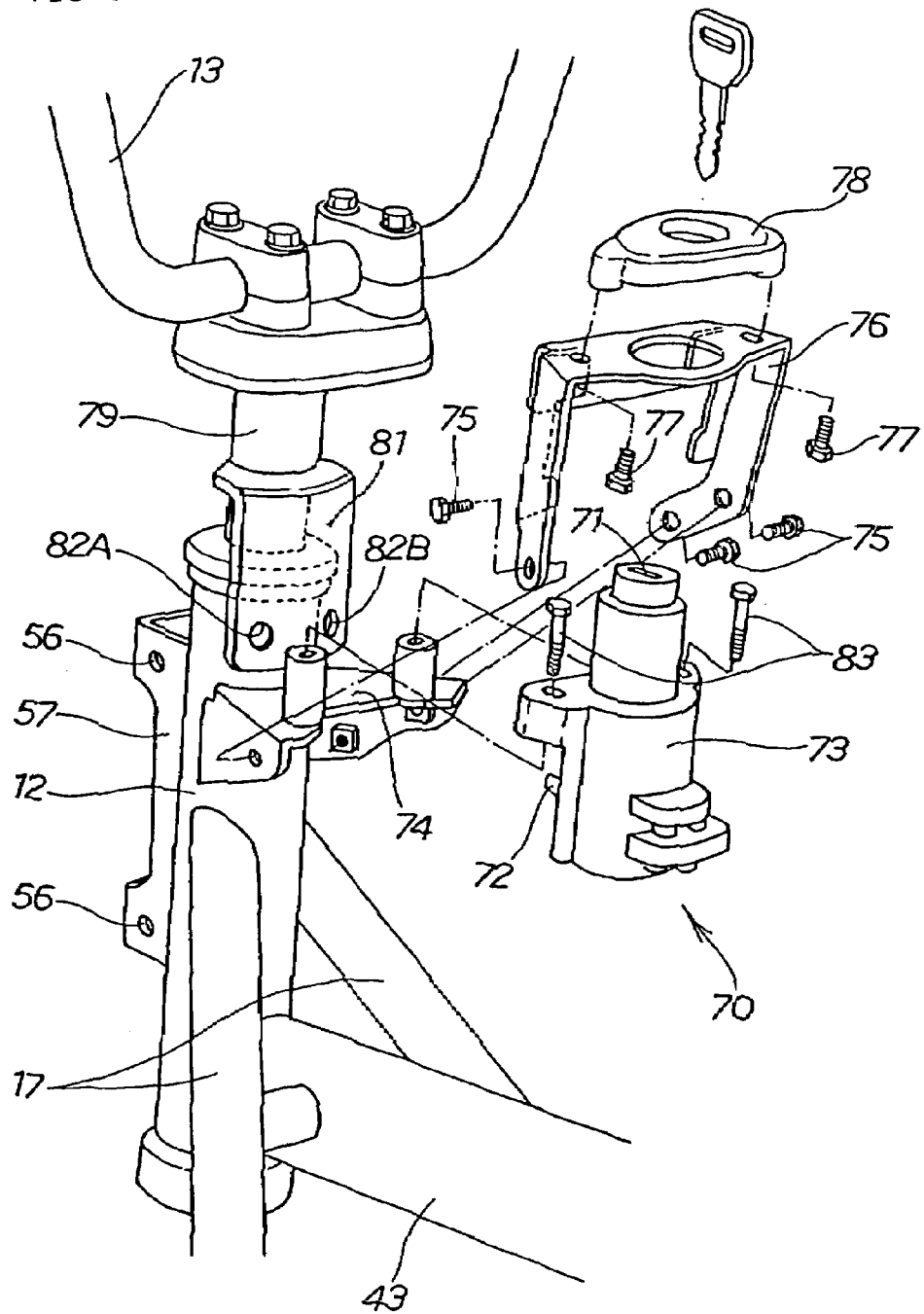
FIG. 9 is an exploded perspective view of a lock device according to the present invention.

FIG. 9 is an exploded perspective view of the lock device according to the present invention. The lock device 70 is comprised of a lock unit 73 comprising a key hole 71, switches (not shown because they are incorporated) and a pin projecting/retracting mechanism (not shown because it is incorporated) for projecting and retracting a lock pin 72; a unit support bracket 74 for attaching the lock unit 73 to the head pipe 12; a gate form bracket 76 to be fixed to the unit support bracket 74 with three small screws 75; a shutter housing 78 to be fixed to the gate form bracket 76 with bolts 77 which are screwed from the lower side; and a lock plate 81 fixed to a steering shaft 79 by welding.

The lock plate 81 is provided with two lock holes 82A, 82B. The head pipe 12 is a non-rotatable member, while the steering shaft 79 is a rotatable member, so that hooking the side of the steering shaft 79 to the head pipe 12 can lock the steering handle. The lock device 70 according to the present invention is based on this principle.

In order to attain the above principle, the lock unit 73 is fixed by bolts 83 to the unit support bracket 74 provided on the back surface of the head pipe 12, and the gate form bracket 76 is mounted in the manner of covering the lock unit 73. Preferably, the shutter housing 78 is preliminarily fixed to the gate form bracket 76 with bolts.

Figure 10:
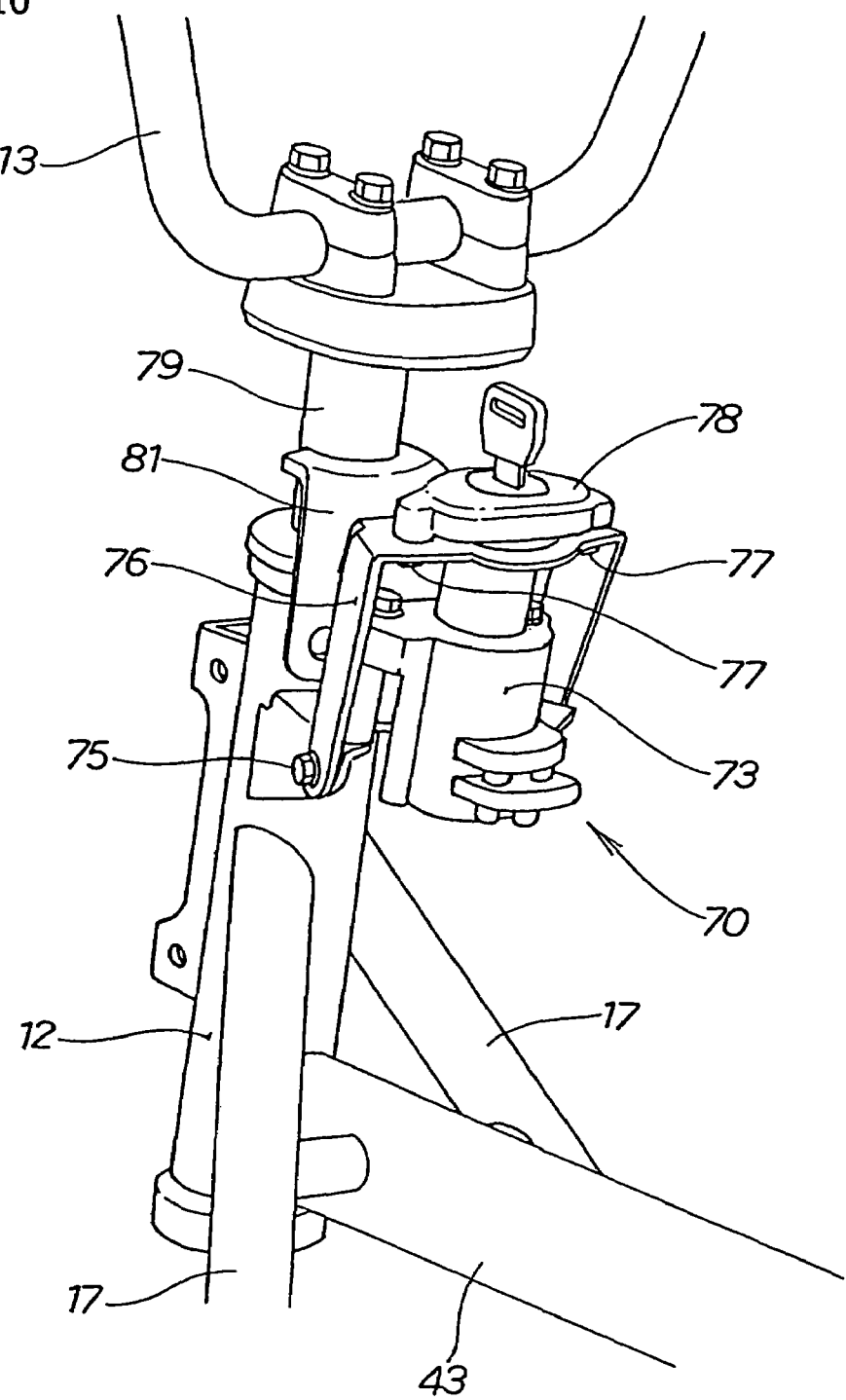
FIG. 10 is a perspective view of the assembled lock device of FIG. 9.

FIG. 10 is a perspective view of the lock device according to the present invention. The lock device is characterized in that the shutter housing 78 is placed on the gate form bracket 76 so mounted as to cover the lock unit 73, and the shutter housing 78 is fixed by bolts 77 which are fastened from the lower side.

As shown in FIG. 7, the head pipe 12 and the steering shaft 79 are covered with the steering handle post cover 27. As a result, most of the lock device 70 in FIG. 10 is covered with the steering handle post cover, leaving only the shutter housing 78 exposed. Since the bolts 77 are not visible and the head portions of the bolts 77 are located on the lower side, it is not easy to slacken the bolts 77 from the upper side. As a result, it is difficult to detach the shutter housing 78, and there is no fear that the lock unit 73 might be damaged.

Figures 11A, 11B:
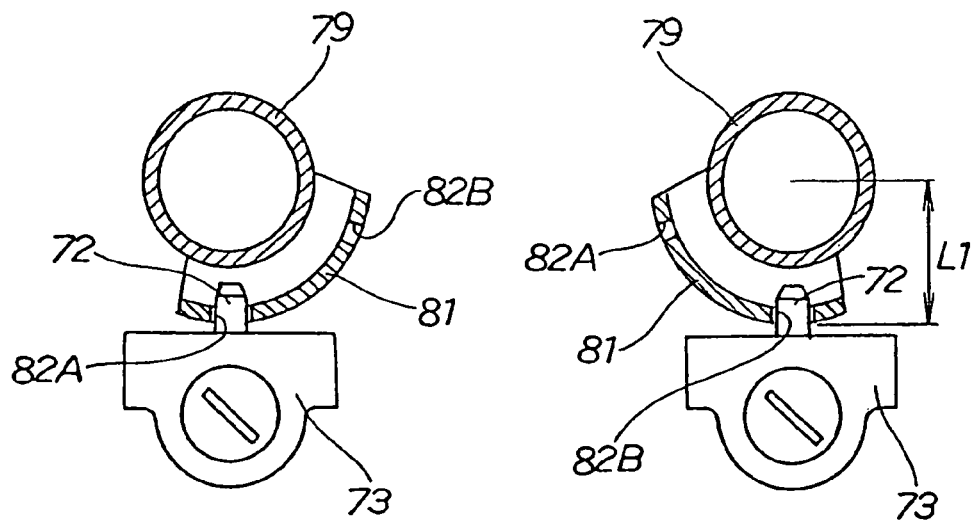
FIGS. 11(a), (b) and (c) are top plan view, partially in cross-section, showing lock mechanisms for comparison between the lock device according to the present invention and a conventional lock device.
Figure 11C:
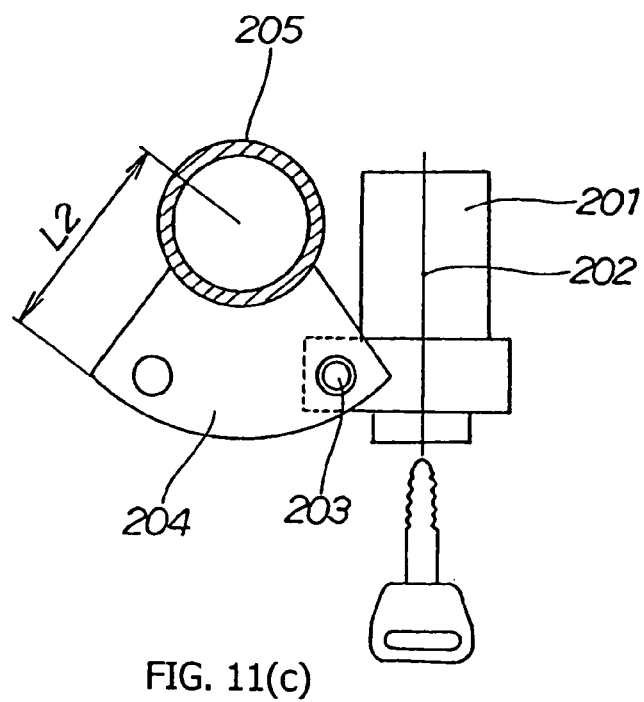

FIGS. 11(a) to (c) are diagrams for comparison between new and conventional lock devices, in which (a) and (b) are function diagrams of the lock device according to the present invention, and (c) is a function diagram of a conventional lock device. FIG. 11(a) shows the condition after the steering shaft 79 is turned counterclockwise substantially fully and a lock pin 72 is inserted into the lock hole 82A. FIG. 11(b) shows the condition after the steering shaft 79 is turned clockwise substantially fully and the lock pin 72 is inserted into the lock hole 82B. In this case, it is a characteristic feature that the longitudinal axis of the lock unit 73 extends in the direction orthogonal to the sheet of the drawing, the longitudinal direction is set substantially parallel to the steering shaft 79, and the lock pin 72 is set horizontal. As a result, the distance L1 from the center of the steering shaft 79 to the outside surface of the lock plate 81 can be set short. FIG. 11(c) shows a conventional product in which the longitudinal axis 202 of a lock unit 201 (numerals of 200 plus something are used for a prior-art example and a comparative example, here and hereinafter) is set horizontal, a lock pin 203 is moved vertically, and a lock plate 204 is composed of a sector plate. The distance L2 from the center of a steering shaft 205 to the outside surface of the lock plate 204 is large. Moreover, since the areas in plan view of the lock plate 204 and the lock unit 201 are large, it is difficult to arrange other apparatuses around the steering shaft 205.

In this point, the product according to the present invention shown in (a) and (b) permits other apparatuses to be easily arranged around the steering shaft 79.

Next, the driver's seat 25 and the combined passenger seat and seat back 26 according to the present invention will be described.

FIG. 12 is a perspective view of a rear luggage carrier and seal according to the present invention. With the combined passenger seat and seat back 26 erected in a vertical orientation, the driver's seat 25 becomes a seat with a backrest.

Operating a lock lever 86 annexed to a connection link 85 can change the angle of the combined passenger seat and seat back 26.

In addition, the figure shows that a rear luggage carrier 87 and the grab rails 32 are attached to the rear frame section 35, which includes a main tube including two seat rails 68, 69 and a crossbar 60.

The rear luggage carrier 87 includes a corrugated plate formed of plastic or a light metal. As compared with a flat plate, the corrugated plate makes it possible to markedly increase the section modulus and, hence, the strength of the plate, to mount more luggage thereon.

Figure 13:
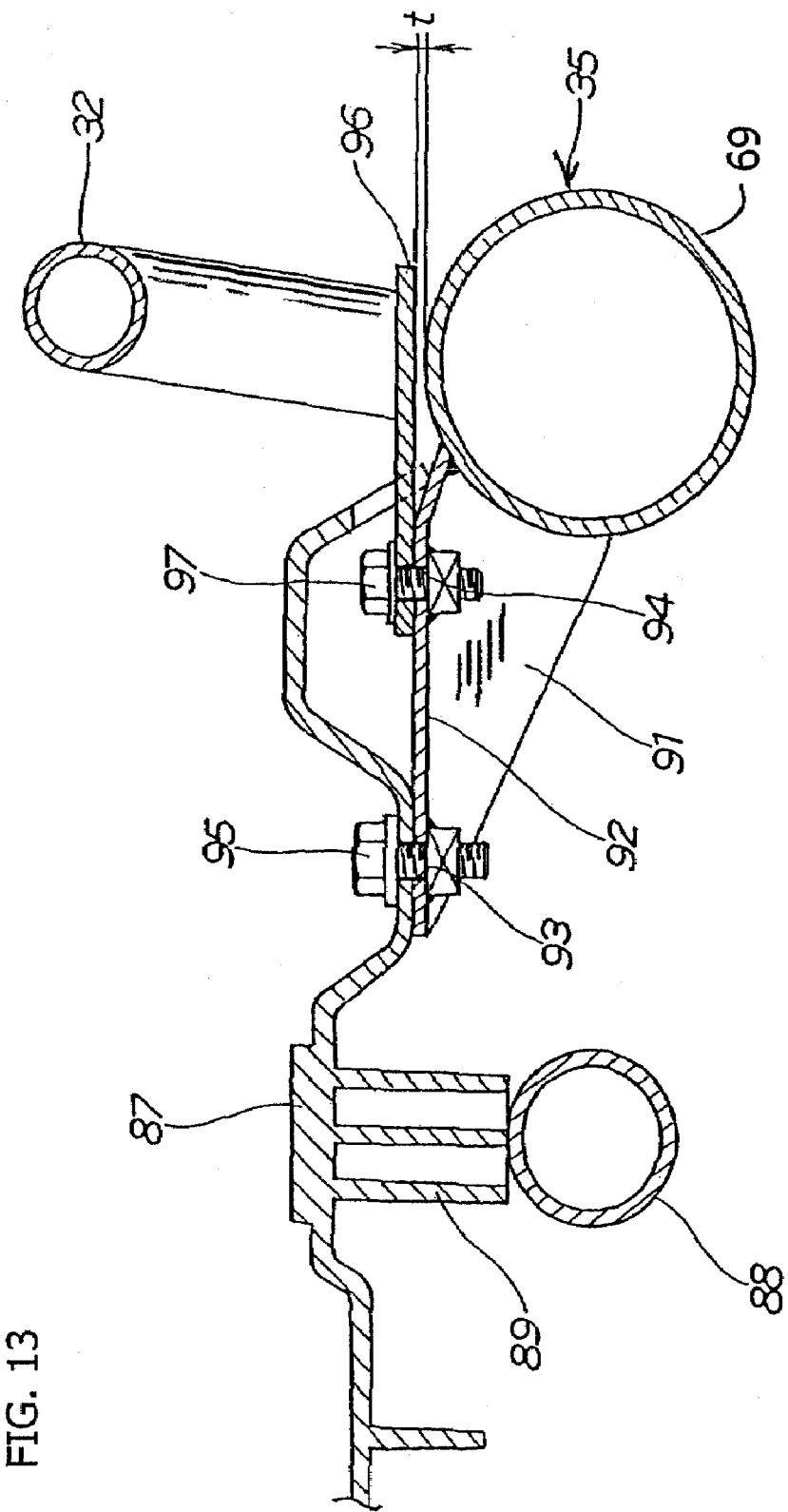
FIG. 13 is a sectional view of the rear luggage carrier of FIG. 12 taken along line 13.

FIG. 13 is a sectional view of the luggage carrier of FIG. 12, taken along line 13 of FIG. 12, and shows the condition where an inside rail 88 is disposed in parallel to the side section 69 of the rear frame section 35 and on the vehicle body center side (on the left side in the figure) relative to the rear frame section 35, so that a leg portion 89, extended downwards from rear luggage carrier 87, can be mounted on and supported by the inside rail 88.

In addition, a triangular bracket 91 is extended from the round pipe form rear frame section 35 toward the vehicle body center side, a top face plate 92 of the triangular bracket 91 is provided with two holes 93 and 94, and the rear luggage carrier 87 is fixed to the hole 93 on the inner side with a bolt 95. A base 96 of the grab rail 32 is attached to the hole 94 on the outer side with a bolt 97, as shown.

The top faceplate 92 of the triangular bracket 91 is set to be higher than the top surface of the rear frame section 35 by a distance t. The distance t is 1 to 2 mm. The reason why such a structure is adopted is as follows.

Where a structure is adopted in which the round pipe form grab rails 32 are attached directly to the round pipe form rear frame section 35, the lower ends of the grab rails 32 are brought into contact with the rear frame section 35, and the content portions are welded. Alternatively, where the grab rails 32 are detachable members and are fastened in a bolt-on type, the fastened portions appear to the outside.

In view of this, in the present invention, the base 96 is extended from the lower end of the grab rail 32, and the tip of the base 96 is inserted to the lower side of the rear luggage carrier 87 and is thereafter bolted to the triangular bracket 91. The grab rails 32 are detachable, and are good in appearance quality, since the fastened portions are invisible.

It should be noted here that a force is naturally exerted on the grab rail 32, resulting in the base 96 flexing vertically. Thus, the base 96 may interfere with the rear frame section 35.

In view of this, the flexure has been calculated by considering the base 96 as a cantilever, and the above-mentioned distance t has been set to a value in excess of the estimated flexure, to thereby prevent the interference.

Figure 14:
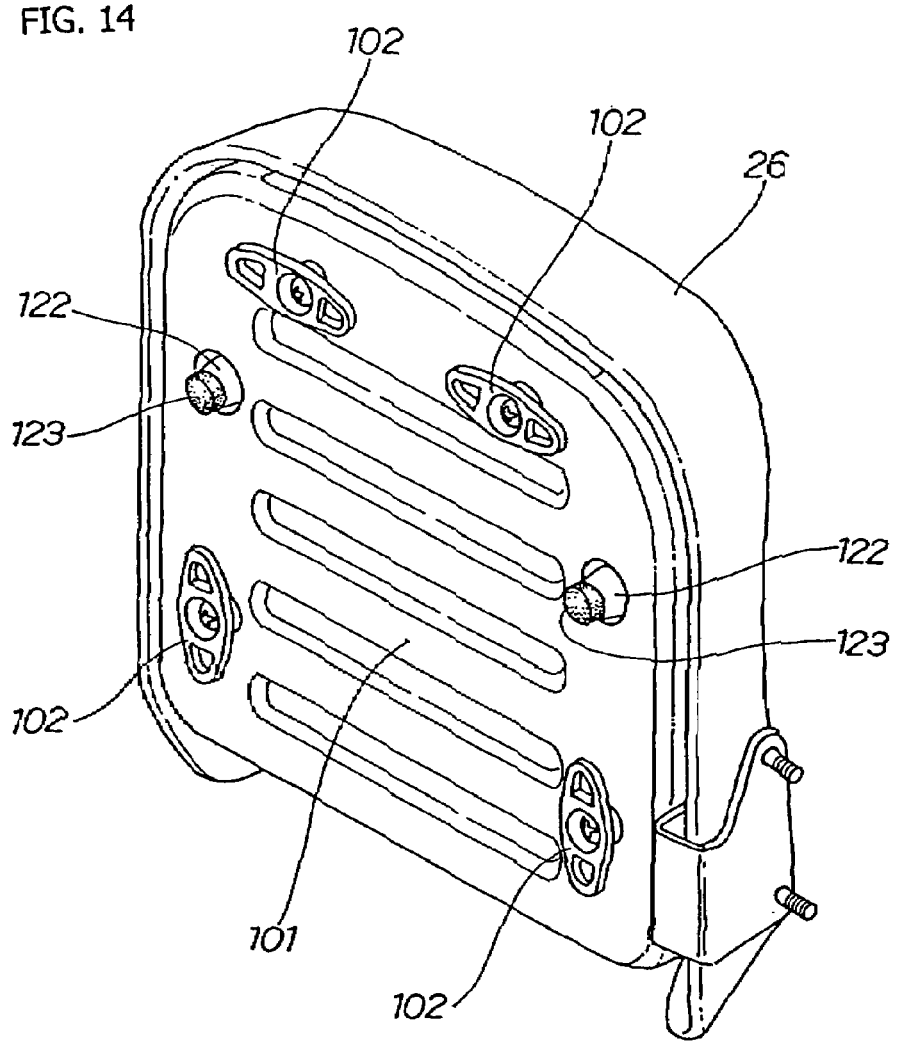
FIG. 14 is a view taken from a vantage point looking along arrow 14 of FIG. 12.

FIG. 14 is a view along arrow 14 of FIG. 12, showing the back surface (bottom surface) structure of the combined passenger seat and seat back 26. The combined passenger seat and seat back 26 is distinguished in that a seat bottom plate (symbol 98 in FIG. 17 which will be described later), surrounding a cushioning material, is further surrounded with a back plate 101, and a total of four T-shaped anchor hooks 102 are provided, for example, at upper left and right positions and lower left and right positions of the back plate 101.

When no luggage is mounted on a rear portion of the vehicle body, the back plate 101 functions as an appearance member, so that the back plate 101 is composed of a decorative plate member. Moreover, since bending forces due to the T-shaped anchor hooks 102 are exerted on the back plate 101, it is necessary to enhance the rigidity of the back plate 101. In view of this, the back plate 101 is composed of a corrugated plate, so as to earn a section modulus. The back plate 101 is suitably composed of a steel plate, a strong plastic plate or the like, and since it is an appearance member, it is subjected to a surface treatment such as coating, plating, coloring, etc.

Figure 15:
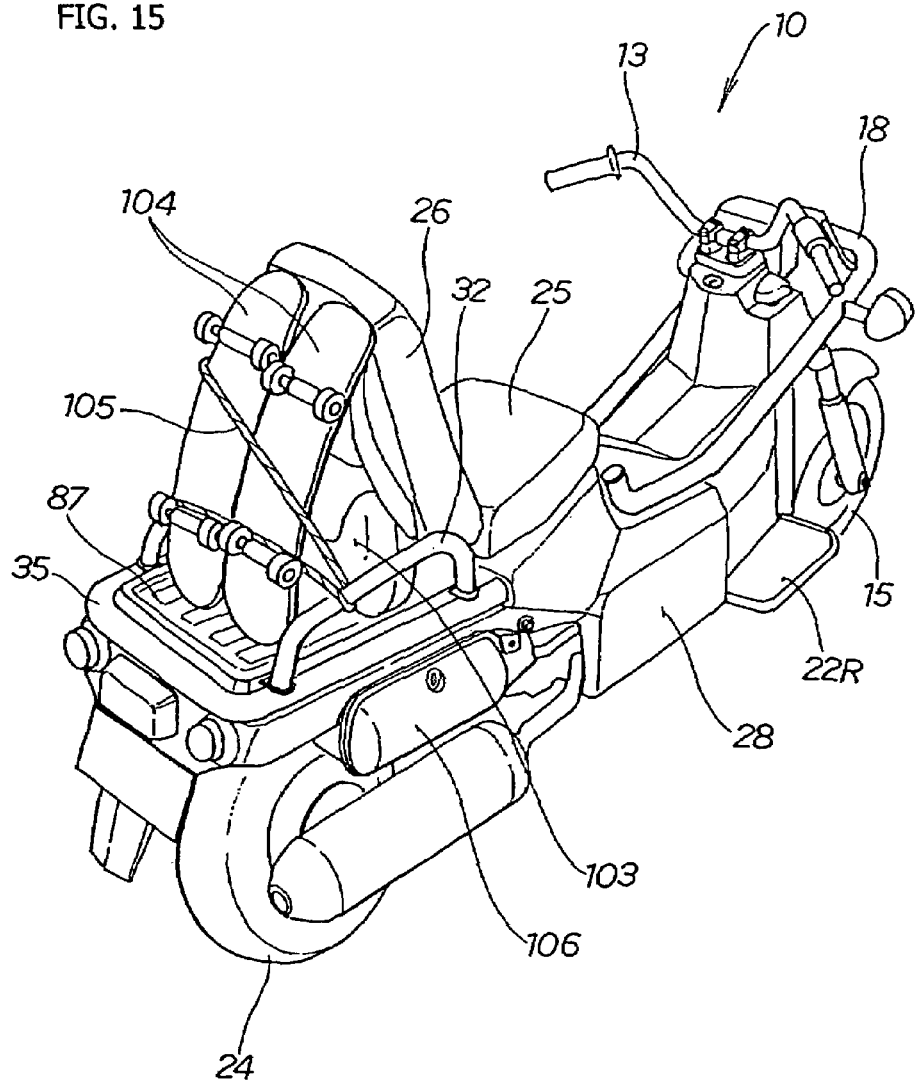
FIG. 15 is a back view of the motor scooter of FIG. 2 according to the present invention.

FIG. 15 is a back view of the motor scooter according to the present invention, showing the condition after a bag 103 and skate boards 104 are mounted on the rear luggage carrier 87, and are fixed with a rope 105 hooked on the grab rails 32 and the combined passenger seat and seat back 26 (the T-shaped anchor hooks not shown here).

When the horizontal rear luggage carrier 87 is only used, the luggage will move forwards or rearwards upon a sudden braking or the like. According to the present invention, the presence of the combined passenger seat and seat back 26 prevents the luggage from sliding forwards, and, with the rope 105 hooked on the T-shaped anchor hooks 102, the luggage can be prevented from moving rearwards. Thus, a large amount of luggage can be stably mounted on the rear luggage carrier 87 and transported.

A luggage container 106 is provided at the right side of the rear luggage carrier 87; the luggage container 106 will be described in detail later.

Figure 16:
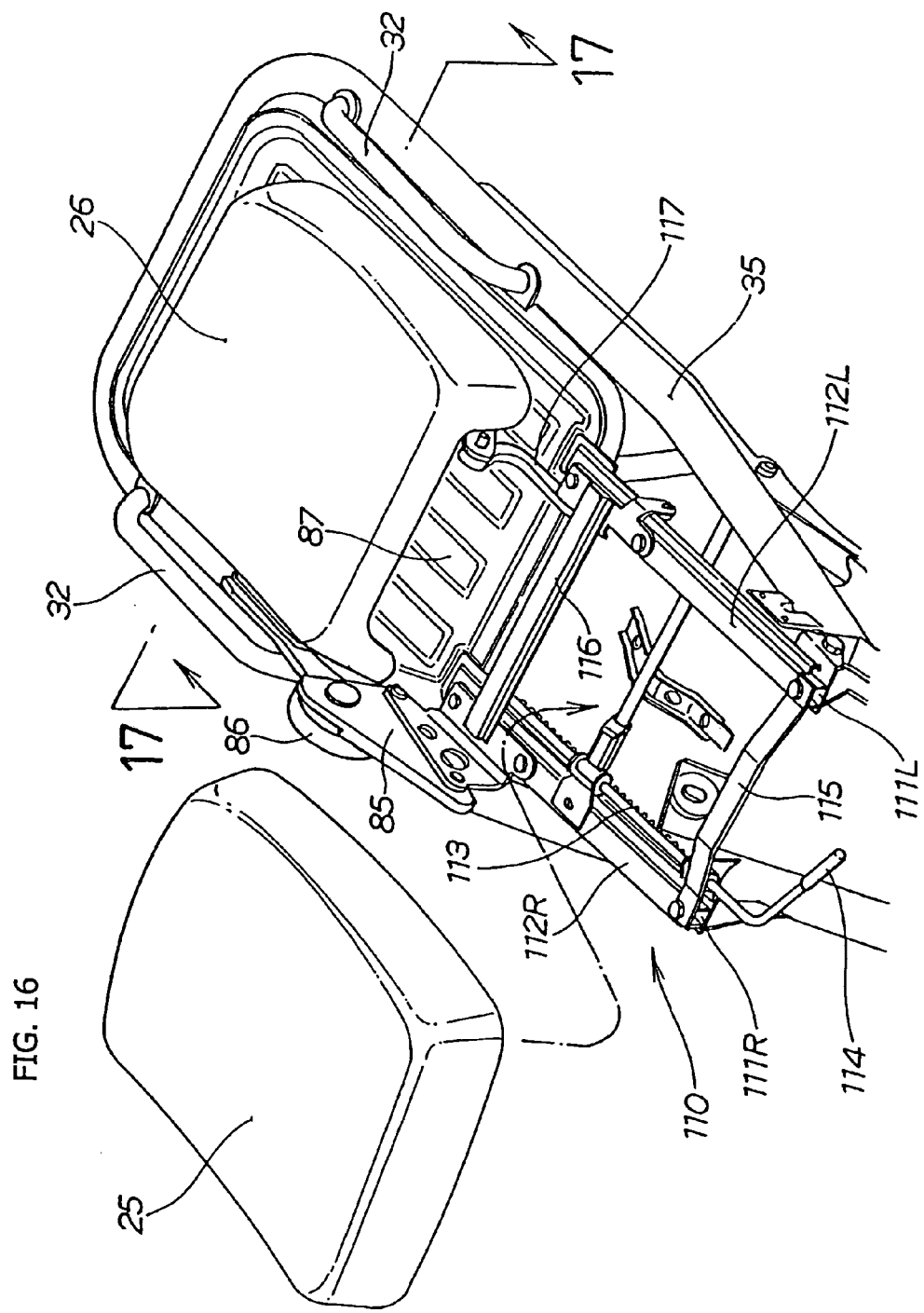
FIG. 16 is an illustration of an optional seat slide mechanism adopted in one embodiment of the present invention.

FIG. 16 is an illustration of a seat slide mechanism adopted in the present invention. The driver's seat 25 according to the present invention can be changed in its position in the front-rear direction according to the driver's taste, and, for achieving the positional change, the seat slide mechanism 110 is provided at a rear portion of the vehicle body.

The seat slide mechanism 110 is comprised of left and right seat rails 111L and 111R, left and right sliders 112L and 112R mounted to the seat rails 111L and 111R so as to be slidable in the front-rear direction, a slide lock serrated member 113 provided on the right slider 112R, an operating lever 114 for switching between a locked condition and an unlocked condition by rotating the serrated member 113, front and rear cross members 115 and 116 for connection between the left and right sliders 112L and 112R, the connection link 85 extended from a rear portion of the right slider 112R, and a link 117 extended from a rear portion of the left slider 112L.

The left and right sliders 112L and 112R can be freely moved in the front-rear direction. The driver's seat 25 is fixed to the left and right sliders 112L and 112R, and the combined passenger seat and seat back 26 is fixed to the connection link 85 and the link 117. As a result, by operating the operating lever 114 so as to release the slide lock, moving the driver's seat 25 and the combined passenger seat and seat back 26 to arbitrary positions in the front-rear direction and returning the operating lever 114, the driver can fix the driver's seat 25 and the combined passenger seat and seat back 26 at the respective positions.

Furthermore, by operating the lock lever 86, the driver or the passenger can set the combined passenger seat and seat back 26 into a horizontal state, as shown in the figure.

Figure 17:
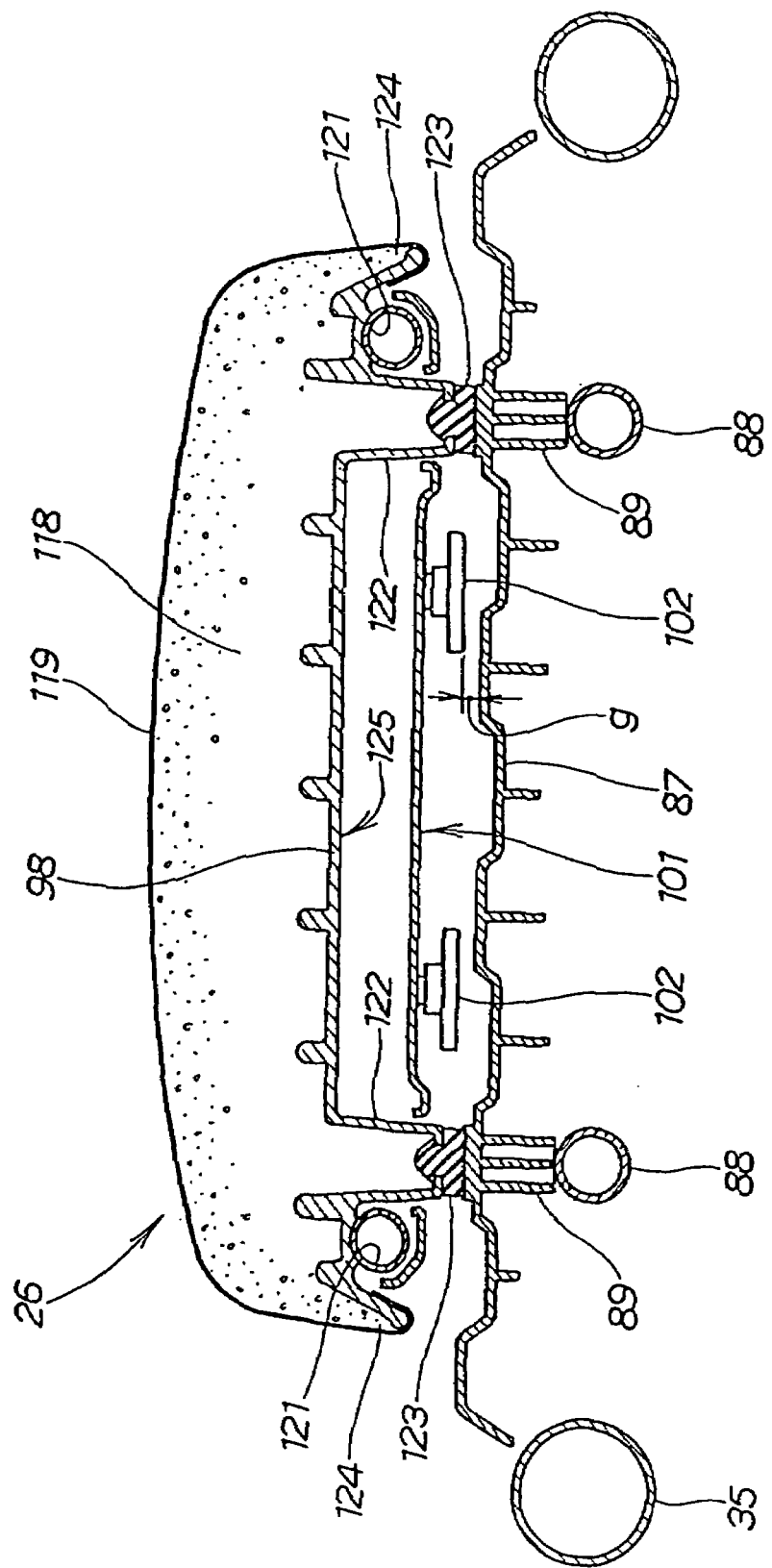
FIG. 17 is a sectional view (grab rails are omitted) taken along line 17-17 of FIG. 16.

FIG. 17 is a sectional view (the grab rails are omitted) taken along line 17-17 of FIG. 16. Describing first the sectional structure of the combined passenger seat and seat back 26, the combined passenger seat and seat back 26 is a structure which is composed basically of a cushioning material 118 such as sponge, a skin 119, and the seat bottom plate 98, wherein a reinforcing frame 121 is set along the seat bottom plate 98, legs 122 are extended from the seat bottom plate 98, and pads 123 are attached to the tip ends (the lower ends, in the figure) of the legs 122.

Incidentally, the reinforcing frame 121 is connected to the link 117 shown in FIG. 16. In addition, the seat bottom plate 98 is provided with edge portions 124 swelled to the lower side and a recessed portion 125 at a central portion thereof, in order to provide the seat with a feeling of thickness. The recessed portion 125 and the reinforcing frame 121 are collectively covered with the back plate 101, thereby enhancing the appearance quality when the combined passenger seat and seat back 26 is erected.

The above-mentioned legs 122 are projected at positions coinciding with the left and right inside rails 88. This ensures that the weight of the passenger can be directly supported by the inside rails 88 through the legs 122 and the leg portions 89 of the rear luggage carrier 87. Only compressive forces are exerted on the leg portions 89 of the rear luggage carrier 87, and no bending force is exerted on the rear luggage carrier 87.

In addition, the T-shaped anchor hooks 102 are set at such a height that a gap g can be secured above the rear luggage carrier 87. The gap g is 4 to 5 mm.

In a small-type vehicle, generally, the luggage carrier may be provided with tiltable hooks or projectable/retractable hooks. Such hooks can be contained when not used, so that a good appearance can be maintained, and, since the hooks are drawn out when used, the hooks can be made large, thereby earning the margins for hooking a rope thereon.

However, if the combined passenger seat and seat back 26 is tilted down by mistake under the condition where the tiltable hooks or projectable/retractable hooks are in a projected state, the rear luggage carrier 87 may be scratched and the hooks themselves may be damaged.

In this relation, according to the present invention, fixed hooks are adopted. With the fixed hooks, it is unnecessary to take care of the situation that the driver or passenger might forget to contain the hooks, and there is no possibility that the related component parts might be damaged. Since the mounting space is limited, however, an increase in the size of the fixed hooks cannot be expected. In view of this, the T-shaped anchor hooks 102 have been adopted. With the T shape, it is possible to secure the horizontal bar of T as left and right two claws, with the vertical bar of T as a center, and the rope can be satisfactorily hooked on the vertical bar and the left and right two claws. Namely, the T-shaped anchor hooks can earn the margins for hooking a rope thereon notwithstanding the small size thereof, as compared with L-shaped hooks.

Next, the details of the luggage container 106 provided on the right lower side of the rear luggage carrier will be described.

Figure 18:
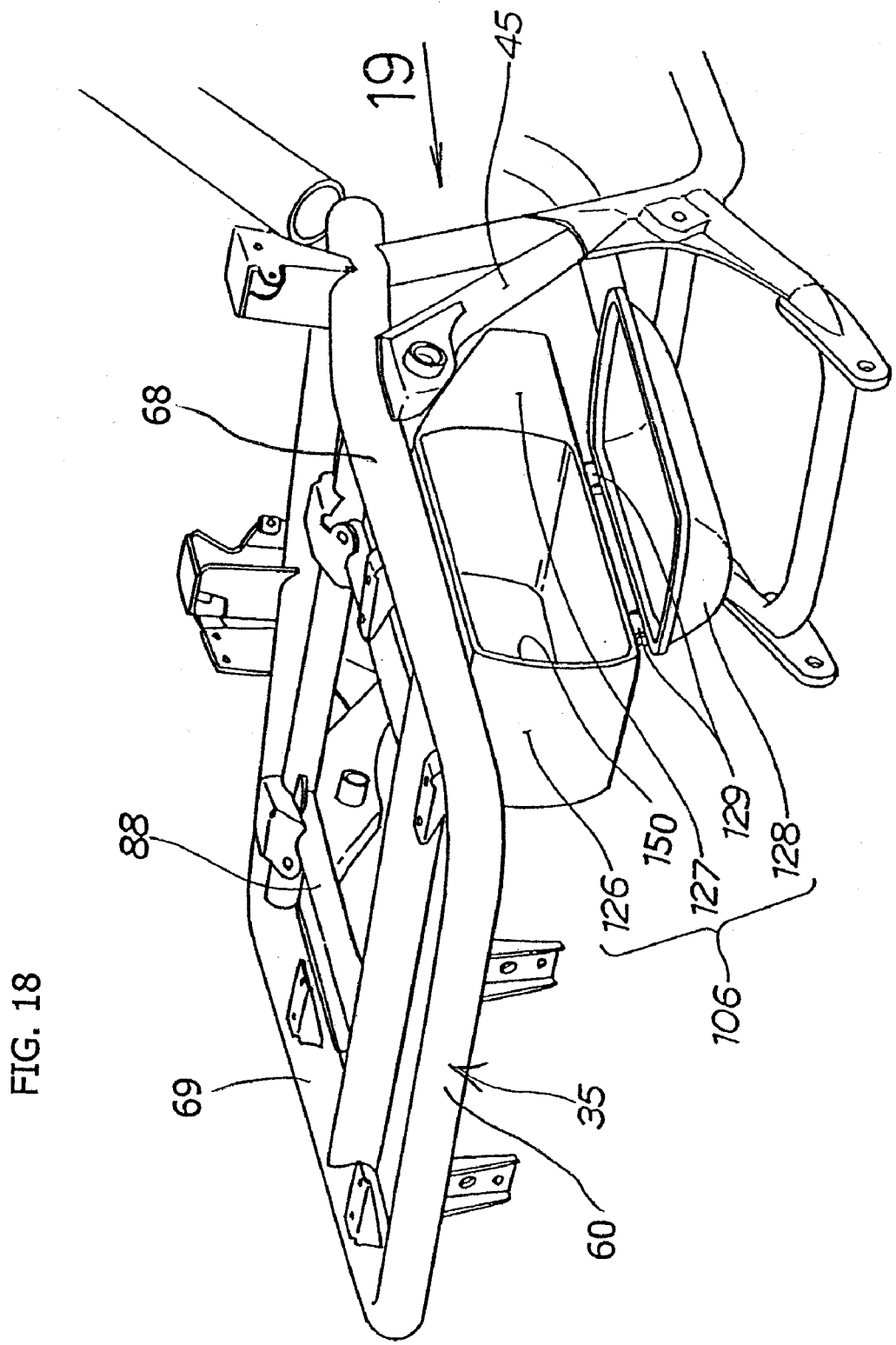
FIG. 18 is a perspective view of a luggage container attached to the back of the frame according to the present invention.

FIG. 18 is a perspective view of the luggage container according to the present invention. The luggage container 106 is comprised of a container 126 having a lateral opening 150, a flange portion 127 projecting from an edge of the opening 150 of the luggage container 126 toward the front side of the vehicle body, a lid 128 for closing the opening 150, and hinges 129, 129 for connecting the lid to the lower edge of the opening 150.

The luggage container 106 is mounted to the vehicle body by attaching the container 126 to the rear frame section 35.

Figure 19:
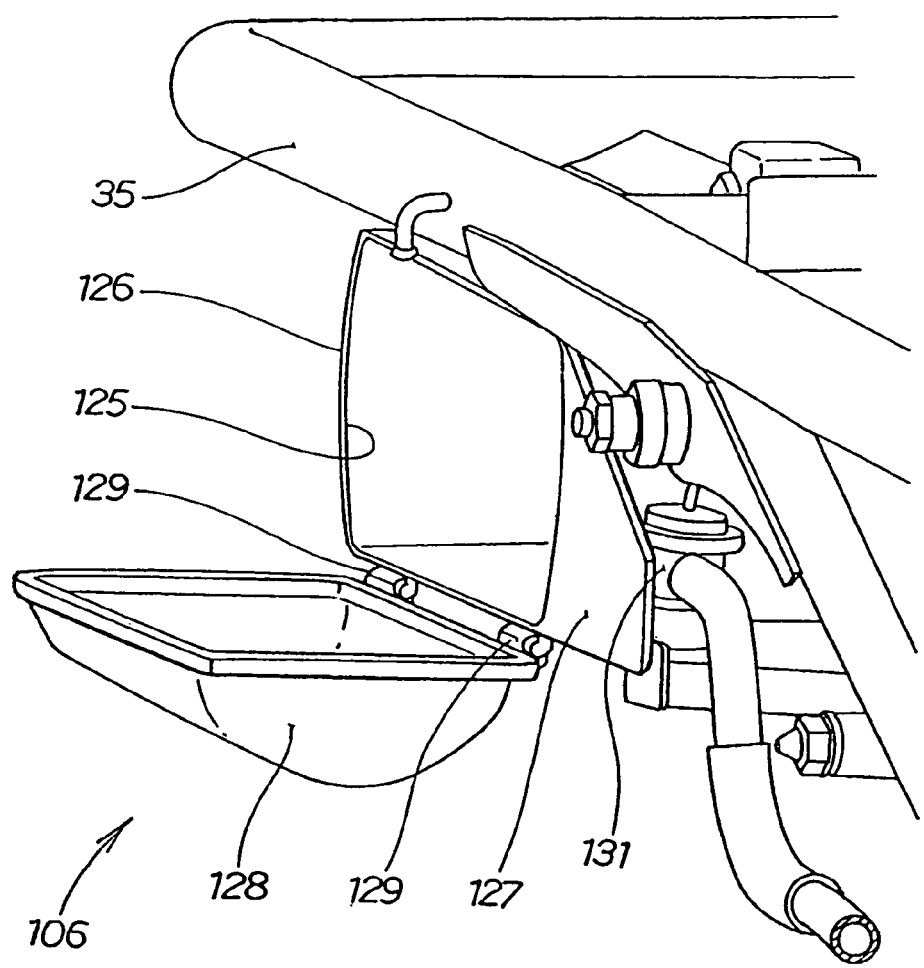
FIG. 19 is a perspective view of the luggage container of FIG. 18 along arrow 19.

FIG. 19 is a view along arrow 19 of FIG. 18, showing that a secondary air control valve 131 is arranged behind the flange portion 127 of the luggage container 106. The secondary air control valve 131 is an important apparatus for supplying an appropriate quantity of air into an exhaust system of an engine, so as to promote combustion of an exhaust gas and to cause combustion of unburned gas components remaining in the exhaust gas, thereby contriving clarification of the exhaust gas.

In a motor scooter, the important secondary air control valve 131 is generally contained in the inside of a vehicle body cover.

In this embodiment, the secondary air control valve 131 is not contained in the inside of the vehicle body cover such as the side cover.

In this case, in order to cope with stones flying from the exterior, it is necessary to cover the secondary air control valve 131 with a protective cover for exclusive use. If this is adopted, it is necessary to provide the exclusive-use protective cover, a mount bracket or brackets and small screws, resulting in an increase in the number of component parts.

In the present invention, the flange portion 127 is projected from the luggage container 106 disposed in the vicinity of the secondary air control valve 131, so as to protect the secondary air control valve 131 with the flange portion 127. As a result, it is unnecessary to newly provide an exclusive-use protective cover, a mount bracket or brackets and small screws, and a reduction in the number of component parts can be contrived. In addition, since the secondary air control valve 131 is disposed in the outside of the vehicle body cover, maintenance and replacement of the secondary air control valve 131 can be carried out by only detaching the luggage container 106.

Next, a protective cover for an intake port of an air cleaner will be described. FIGS. 20(a) and (b) are side views showing the air cleaner and the power unit, in which (a) pertains to a comparative example, and (b) pertains to an embodiment of the present invention.

In the comparative example shown in (a), an air cleaner 211 is disposed on the upper side of a power unit 210, and an intake port 213 of the air cleaner 211 is covered with a vehicle body cover 212. Motor scooters generally adopt this type of structure.

In the embodiment shown in (b), an air cleaner 132 is disposed on the power unit 23, and an intake port 133 of the air cleaner 132 is not covered with a vehicle body cover 134. On one hand, the vehicle body cover 134 can be reduced in size, but, on the other hand, foreign matters such as stones, sand, mud, etc. flying from the viewer's side are liable to penetrate into the intake port 133, so that there is need for a countermeasure against the penetration. When it is attempted to provide an intake port cover as the countermeasure, it is necessary to provide a cover support bracket for the intake port cover. However, adoption of the cover support bracket is unfavorable because it leads to an increase in the number of component parts.

Figure 21:
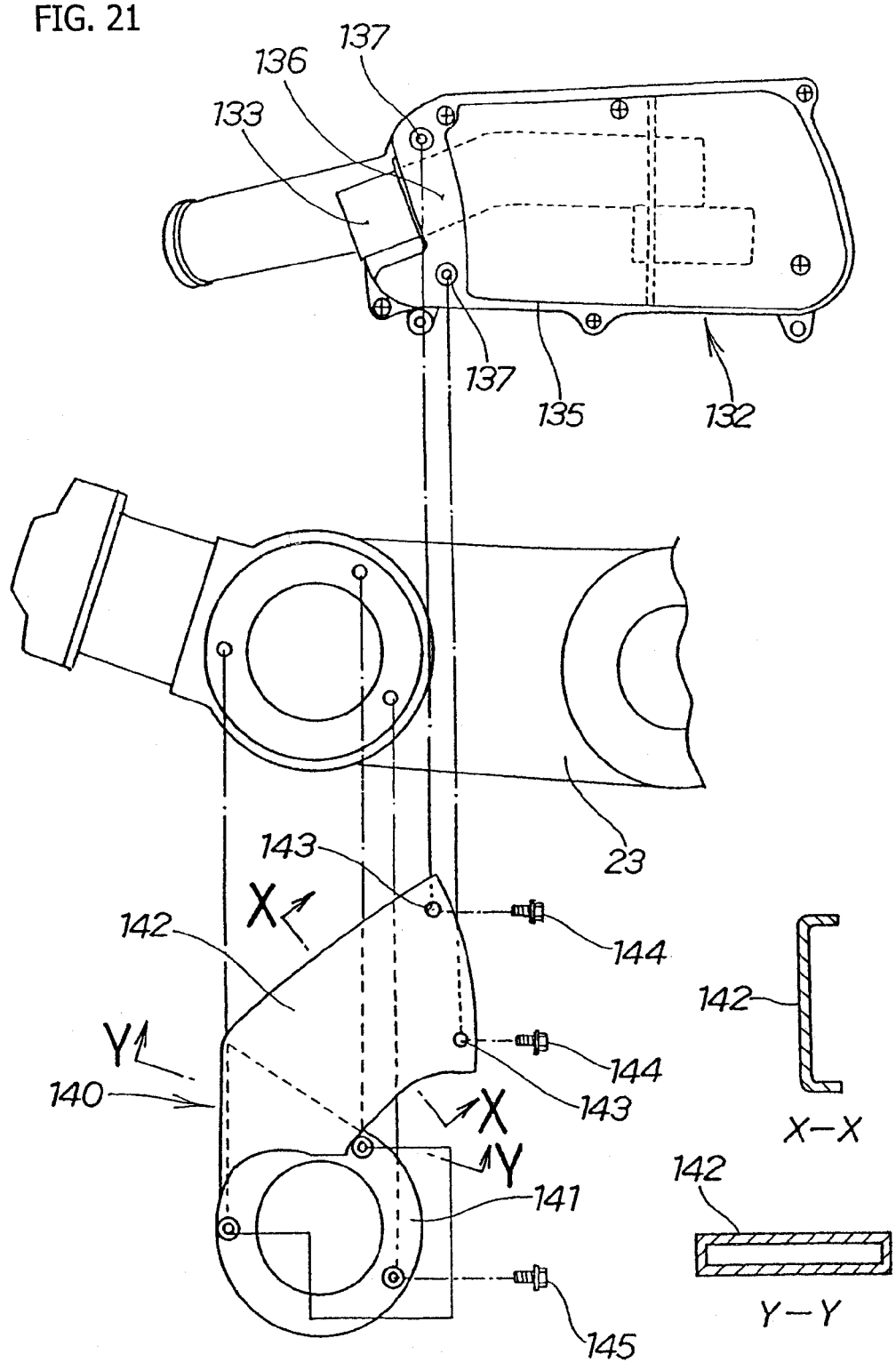
FIG. 21 is an illustration of the point in mounting an intake port cover according to the present invention.

FIG. 21 illustrates the point in mounting an intake port cover according to the present invention. The present inventors have tried to utilize a lid 128 of the power unit 23 that is located in the vicinity of the intake port 133.

Namely, a case 135 of the air cleaner 132 is provided with a recessed portion 136 that is recessed toward the depth side of the drawing, and the recessed portion 136 is provided with screw holes 137.

The intake port cover 140 is comprised of a circular plate portion 141 roughly the same in shape with the lid 128, a cover portion 142 projected from the circular plate portion 141, and bolt holes 143 provided at the tip of the cover portion 142.

Incidentally, the reference indicia X-X shown at a right lower portion of the figure indicates section X-X of the cover portion 142, while the reference indicia Y-Y indicates section Y-Y of the cover portion 142, which show that a base portion of the cover portion 142 is a duct portion. Through the duct portion, cooling air can be led to the power unit 23.

The intake port cover 140 is fixed with bolts 144 by superposing the bolt holes 143 on the screw holes 137 and the circular plate portion 141 is co-fastened and fixed together with the lid 128 by bolts 145 which have fastened the lid 128.

Figure 22:
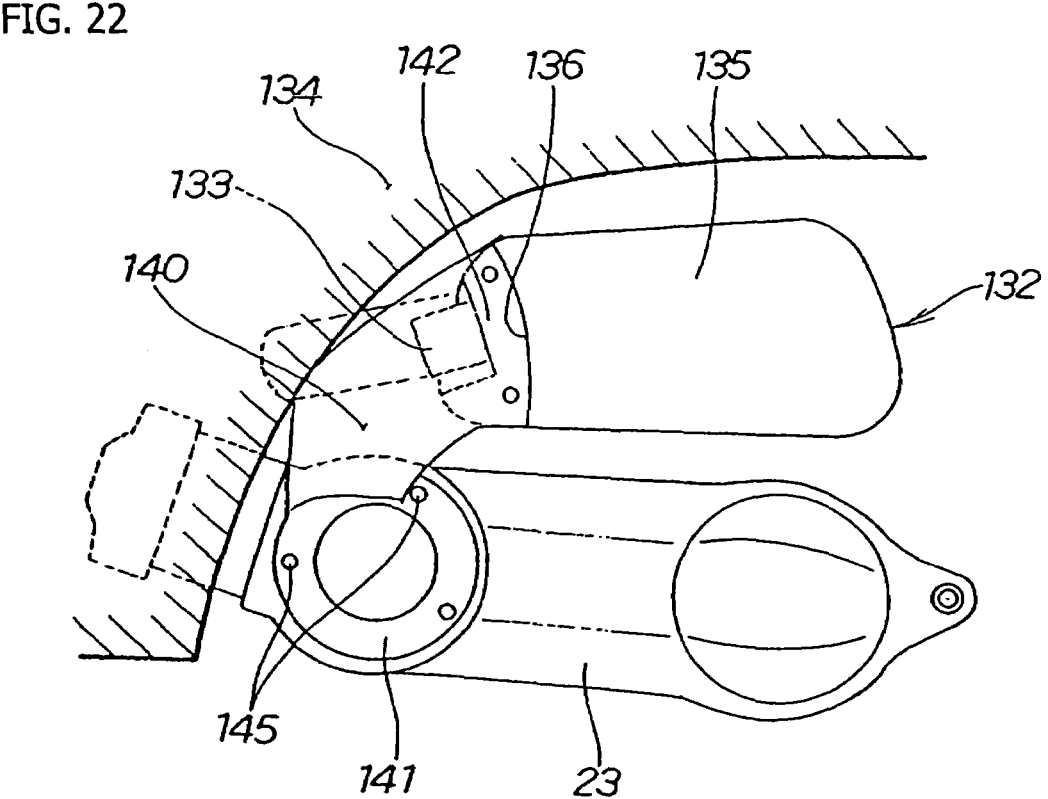
FIG. 22 is an illustration of the condition where the intake port cover according to the present invention is mounted.

FIG. 22 shows the condition where the intake port cover according to the present invention is mounted in position, and shows that the intake port cover 140 is mounted by bridging it between the power unit 23 and the air cleaner 132, without using a bracket for exclusive use.

In addition, the cover portion 142 of the intake port cover 140 is fitted into the recessed portion 136, resulting in that the cover portion 142 is flush with the case 135 of the air cleaner 132, which provides a good appearance quality.

FIG. 23 is a perspective view of the vehicle body frame according to the present invention, showing that the main frame section 43 is extended from the head pipe 12, and the two rear frame sections 35, generally called seat rails, are extended from the main frame section 43. A fuel tank 147 is mounted to the vehicle body frame 11, as shown.

Incidentally, the auxiliary frame according to the present invention may be any member that can later be mounted to the existing main frame section or to the main frame section and the rear frame sections by bolts or the like, and the shape of the auxiliary frame is arbitrary. Besides, the vehicle component parts to be attached to the auxiliary frame can be selected freely.

The present invention, constituted in the embodiment described above, displays the following effects.

According to the first aspect of the invention, the auxiliary frame has its front portion attached to the head pipe and has its rear portion attached to a portion in the vicinity of the engagement portion between the main frame section and the rear frame sections, so that a luggage mounting space can be secured, without specially reinforcing the auxiliary frame.

In addition, since the left-right width of the auxiliary frame is substantially equal to that of the left and right two lower pipes, a rectangular frame can be constituted of the auxiliary frame and the lower pipes, thereby enhancing the appearance quality.

With the rectangular frame, the vehicle body cover can be constituted by only attaching flat plate-like covers. The cover can be easily made lighter in weight and compacter, while maintaining the appearance quality.

Furthermore, a small-type vehicle having a new form can be created by only diverting a vehicle body frame of a conventional full-cover type motor scooter and adding the auxiliary frame to the vehicle body frame.

Although the present invention has been described herein with respect to a specific illustrative embodiment thereof, the foregoing description is intended to be illustrative, and not restrictive. Those skilled in the art will realize that many modifications of the embodiments could be made which would be operable. All such modifications, which are within the scope of the claims, are intended to be within the scope and spirit of the present invention.

Having thus, described the invention, what is claimed is:

1. A frame assembly for a motorized vehicle, comprising:
   a vehicle body frame including
      a head pipe,
      a main frame section attached to and extending rearwardly from the head pipe,
      first and second rear frame sections attached to and extending rearwardly from said main frame section, left and right down tubes extending downwardly from said head pipe, left and right lower pipes extending rearwardly from each of the respective down tubes, and medial frame sections respectively connected to and rising upwardly from each of said lower pipes, said medial frame sections also being connected to said rear frame sections; and an auxiliary frame which is separate from and operatively attached to the vehicle body frame, said auxiliary frame extending rearwardly along said main frame section from a front side of said head pipe, said auxiliary frame having a left-right width substantially equal to a distance between said left and right lower pipes, inclusive, and said auxiliary frame comprising a front portion operatively attached to said head pipe, and a rear portion operatively attached to a portion of the vehicle body frame adjacent a juncture between said main frame section and said rear frame sections.

2. A motorized vehicle, comprising the frame assembly of claim 1, and a plurality of plate-like covers attached to selected areas of the frame assembly.

3. The frame assembly of claim 1, further comprising a Y-shaped connector used to join the main frame section to the rear frame sections.

4. The frame assembly of claim 1, wherein the auxiliary frame comprises a substantially U-shaped tube and a luggage-supporting crown pipe attached to and extending upwardly from the substantially U-shaped tube.

5. The frame assembly of claim 1, further comprising left and right foot supports attached to the lower pipes, for supporting feet of a driver, each of the foot supports comprising a receiving plate and a peripheral pipe extending around an edge portion of the receiving plate.

6. The frame assembly of claim 1, further comprising a pair of reinforcing stays extending between the respective medial frame sections and the respective rear frame sections.

7. The frame assembly of claim 1, wherein the rear frame sections are interconnected by a crossbar at rear portions thereof.

8. The frame assembly of claim 1, further comprising a rear luggage carrier operatively attached to the rear frame sections.

9. The frame assembly of claim 8, wherein the rear luggage carrier comprises a pair of grab bars operatively attached to the rear frame sections.

10. The frame assembly of claim 8, wherein the rear luggage carrier comprises a corrugated plate extending between the rear frame sections.

11. The frame assembly of claim 8, wherein the rear luggage carrier comprises a plate extending between the rear frame sections, and an inside rail disposed between the rear frame sections, wherein said inside rail helps support said plate.

12. The frame assembly of claim 1, further comprising a seat operatively attached to the rear frame sections, said seat comprising a main seat cushion and a seat back which is pivotally movable between an upright seat back position and a flat position in which the seat back functions as a passenger seat.

13. The frame assembly of claim 12, wherein the seat back has a plurality of anchor hooks attached to a rear surface thereof, to facilitate attachment of luggage to the frame assembly.

14. A frame assembly for a motorized vehicle, comprising a vehicle body frame with an upper frame, a lower basket frame integrally attached to and extending downwardly from said upper frame; and an auxiliary frame which is separate from and operatively attached to said vehicle body frame;

wherein the upper frame comprises a head pipe, a tubular main frame section attached to the head pipe, a pair of seat rails extending rearwardly in a divergent fashion from the main frame section, and a rear crossbar interconnecting the seat rails at rear portions thereof;

wherein the lower basket frame comprises a pair of left and right down tubes extending downwardly in a divergent fashion from the head pipe, a pair of left and right lower pipes extending rearwardly from lower ends of the respective down tubes, and a pair of medial frame sections extending between rear ends of the lower pipes and the seat rails; and wherein said auxiliary frame has a width substantially equal to a distance between said left and right lower pipes.

15. The frame assembly of claim 14, wherein the auxiliary frame comprises a substantially U-shaped tube and a luggage-supporting crown pipe attached to and extending upwardly from the substantially U-shaped tube.

16. The frame assembly of claim 14, further comprising left and right foot supports attached to the lower pipes, for supporting feet of a driver.

17. The frame assembly of claim 16, wherein each of the foot supports comprises a receiving plate and a peripheral pipe extending around an edge portion of the receiving plate.

18. The frame assembly of claim 14, further comprising a pair of reinforcing stays extending between the respective medial frame sections and the respective seat rails.

19. The frame assembly of claim 14, further comprising a rear luggage carrier operatively attached to the seat rails.

20. The frame assembly of claim 14, further comprising a pair of grab bars operatively attached to the seat rails.

21. A frame assembly for a motorized vehicle, comprising a vehicle body frame with an upper frame, a lower basket frame integrally attached to and extending downwardly from said upper frame; and an auxiliary frame which is separate from and operatively attached to said vehicle body frame;

wherein the upper frame comprises a head pipe, a tubular main frame section attached to the head pipe, a pair of seat rails extending rearwardly in a divergent fashion from the main frame section, and a rear crossbar interconnecting the seat rails at rear portions thereof;

wherein the lower basket frame comprises a pair of down tubes extending downwardly in a divergent fashion from the head pipe, a pair of lower pipes extending rearwardly from lower ends of the respective down tubes, and a pair of medial frame sections extending between rear ends of the lower pipes and the seat rails; and wherein a rear luggage carrier is operatively attached to the seat rails which comprises a plate extending between the seat rails, and an inside rail disposed between the seat rails, wherein said inside rail helps support said plate.

22. The frame assembly of claim 14, further comprising a seat operatively attached to the seat rails, said seat comprising a main seat cushion and a seat back which is movable between an upright seat back position and a flat position in which the seat back functions as a passenger seat.

* * * * *